United States Patent [19]
Kimura et al.

[11] Patent Number: 5,461,770
[45] Date of Patent: Oct. 31, 1995

[54] METHOD AND APPARATUS FOR CONTINUOUS CASTING AND HOT-ROLLING

[75] Inventors: Tomoaki Kimura, Hitachi; Mitsuo Nihei, Tokyo; Kenji Horii; Kenichi Yoshimoto, both of Hitachi, all of Japan

[73] Assignee: Hitachi, Ltd., Tokyo, Japan

[21] Appl. No.: 187,491

[22] Filed: Jan. 28, 1994

[30] Foreign Application Priority Data

| Jan. 29, 1993 | [JP] | Japan | 5-013255 |
| Mar. 25, 1993 | [JP] | Japan | 5-066413 |
| May 13, 1993 | [JP] | Japan | 5-111395 |

[51] Int. Cl.$^6$ .............................. B21B 1/46; B21B 13/22
[52] U.S. Cl. ............................................. 29/527.7; 29/336
[58] Field of Search ..................... 164/476, 417; 29/527.7, 33 C

[56] References Cited

U.S. PATENT DOCUMENTS

| 3,385,579 | 5/1968 | Peck et al. |
| 4,182,146 | 1/1980 | Wladika et al. |
| 4,263,798 | 4/1981 | Wladika et al. |
| 4,829,656 | 5/1989 | Rohde |
| 4,942,656 | 7/1990 | Benedetti et al. ............ 29/527.7 X |
| 5,009,396 | 4/1991 | den Hartog et al. |
| 5,014,412 | 5/1991 | Nobis et al. ............... 29/527.7 |
| 5,075,953 | 12/1991 | Braud .................... 29/33 C X |
| 5,133,205 | 7/1992 | Rostik et al. |
| 5,156,800 | 10/1992 | Buchet et al. |
| 5,182,847 | 2/1993 | Guse et al. ............... 29/527.7 |
| 5,276,952 | 1/1994 | Thomas et al. ............. 29/33 C X |
| 5,303,766 | 4/1994 | Kreijger et al. ............ 29/33 C X |
| 5,307,864 | 5/1994 | Arvedi et al. .............. 164/476 |
| 5,329,688 | 7/1994 | Arvedi et al. .............. 29/527.7 |

FOREIGN PATENT DOCUMENTS

| 0185847 | 7/1986 | European Pat. Off. |
| 0499851 | 8/1992 | European Pat. Off. |

(List continued on next page.)

OTHER PUBLICATIONS

Patent Abstracts of Japan, vol. 7, No. 74 (M–203) 26 Mar. 1983 Japanese Patent Publication 58–3715 Published Jan. 10, 1983.
Patent Abstracts of Japan, vol. 7, No. 24 (M–189) 29 Jan. 1983 Japanese Patent Publication 57–177809 Published Nov. 1, 1982.
Patent Abstracts of Japan, vol. 8 No. 207 (M–327) 21 Sep. 1984 Japanese Patent Publication 59–94501 Published May 31, 1984.
Patent Abstracts of Japan, vol. 8, No. 76 (M–288) 09 Apr. 1984 Japanese Patent Publication 58–221602 Published Dec. 23, 1983.
Patent Abstract–Japanese Patent Publication No. JP–A–1–181901; 19 Jul. 1989.
Patent Abstract–Japanese Patent Publication No. JP–A–62–3816; 9 Jan. 1987.
Patent Abstract–Japanese Patent Publication No. JP–A–63–207403; 26 Aug. 1988.
Patent Abstract–Japanese Patent Publication No. JP–A–60–141305; 26 Jul. 1985.
Patent Abstract–Japanese Patent Publication No. JP–A–61–56708; 22 Mar. 1986.

(List continued on next page.)

Primary Examiner—J. Reed Batten, Jr.
Attorney, Agent, or Firm—Evenson McKeown Edwards & Lenahan

[57] ABSTRACT

In a continuous process for continuous casting and hot-rolling of metal sheet, off-line storage of a slab takes place in a thermally insulated storage chamber located alongside a thermally insulated zone through which the slab lengths travel in the production line between a cutter for the slab and the hot-rolling mill train. On stoppage of the hot-rolling mill train, at least one slab length is transferred laterally to the off-line thermally insulated storage chamber. To improve ductility, an induction heating stage is combined with a subsequent temperature-maintaining stage in the furnace for homogenization of temperature within the slab. Both these stages are performed on the slab at its casting thickness.

27 Claims, 15 Drawing Sheets

FOREIGN PATENT DOCUMENTS

| | | |
|---|---|---|
| 2385801 | 3/1978 | France . |
| 3322407 | 1/1985 | Germany . |
| 3324487 | 1/1985 | Germany . |
| 3708050 | 9/1988 | Germany .............................. 164/417 |
| 4009861 | 10/1991 | Germany . |
| 58-20301 | 2/1983 | Japan . |
| 58-163505 | 9/1983 | Japan . |
| 60-18201 | 1/1985 | Japan .................................. 29/527.7 |
| 60-141305 | 7/1985 | Japan . |
| 60-255201 | 12/1985 | Japan .................................. 29/527.7 |
| 61-56708 | 3/1986 | Japan . |
| 61-56705 | 3/1986 | Japan . |
| 61-67549 | 4/1986 | Japan .................................. 164/476 |
| 61-176401 | 8/1986 | Japan . |
| 62-3816 | 1/1987 | Japan . |
| 63-207403 | 8/1988 | Japan . |
| 1-96201 | 6/1989 | Japan . |
| 1-181901 | 7/1989 | Japan . |
| 1049859 | 11/1966 | United Kingdom . |

OTHER PUBLICATIONS

Patent Abstract–Japanese Patent Publication No. JP–A–58–163505; 28 Sep. 1983.
Patent Abstract–Japanese Patent Publication No. JP–A–61–176401; 8 Aug. 1986.
Patent Abstract–Japanese Patent Publication No. JP–A–61–176402; 8 Aug. 1986.
Patent Abstract–Japanese Utility Model No. 1–96201; Jun. 26, 1989.
Patent Abstract–Japanese Patent Publication No. JP–A–58–20301; 5 Feb. 1983.
Patent Abstract–Japanese Patent Publication No. JP–A–61–56705; 22 Mar. 1986.
Patent Abstracts of Japan, vol. 9, No. 135 (M–386) 11 Jun. 1985 & JP–A–60 018 201 (Nippon Kokan) 30 Jan. 1985.
MPT–Metallurgical Plant and Technology, No. 2/1992.

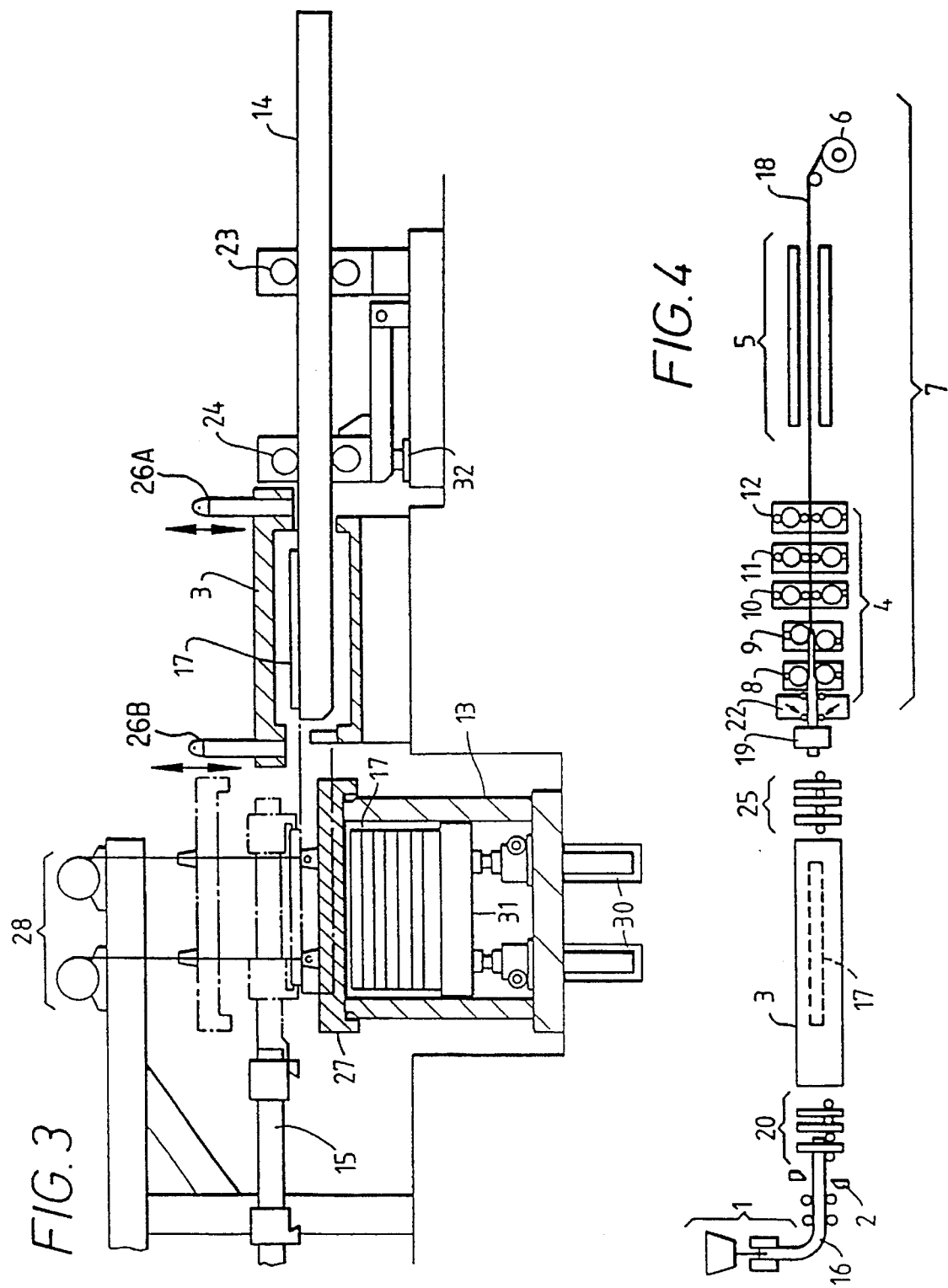

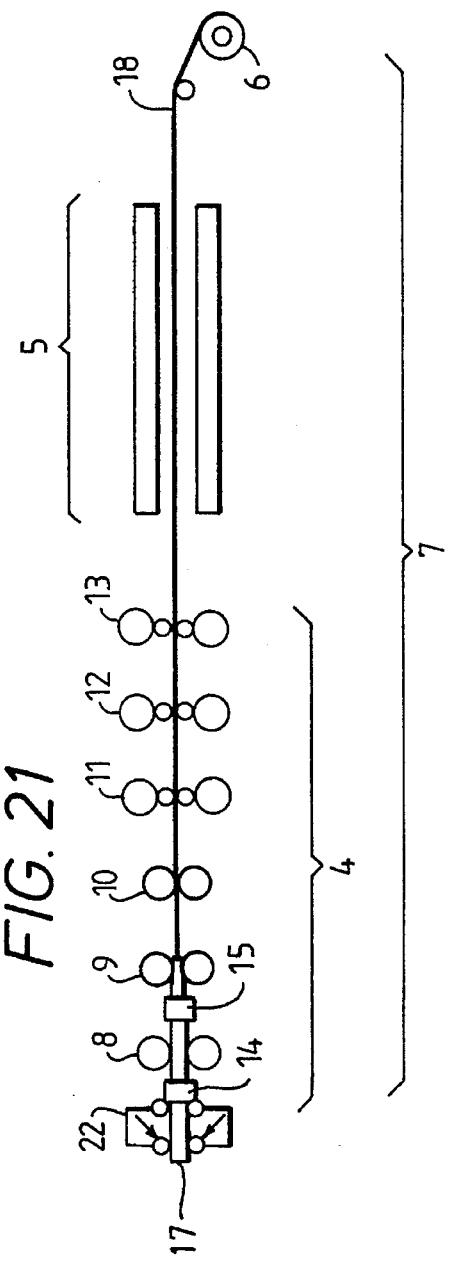
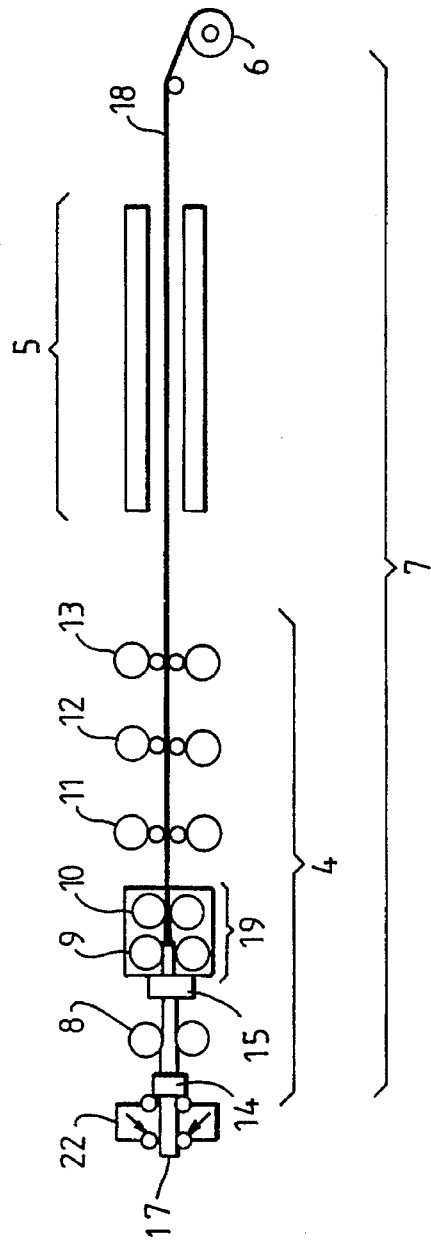

METHOD AND APPARATUS FOR CONTINUOUS CASTING AND HOT-ROLLING

BACKGROUND OF THE INVENTION

1. Field of the Invention

This invention relates to methods and apparatus for continuous casting and hot-rolling of metal to produce metal strip, using a continuous production line. The invention is primarily applicable to steel production, though not restricted thereto, and will be described below mainly in relation to steel.

2. Description of the Prior Art

The continuous operation of a continuous casting and hot-rolling facility can save energy and labor to a great extent as compared with conventional separate factories for steelworks and rolling-mill. Such continuously operated facilities have been increasing in number in recent years.

Merits of the continuous operation include decrease of energy consumption, since a slab temperature decrease is made as little as possible to minimize re-heating, and labor saving as no transport of the slab from the steelworks to the rolling-mill is needed.

To make continuous the operations of the continuous casting process and the hot-rolling process, it is desired that the combined facility should be optimized in total with respect to the material to be produced, amount of production, method of obtaining a raw material, facility cost, running cost, energy consumption, and manufacturing and labor costs.

Methods of making continuous the operations of the continuous casting process and the hot-rolling process can be roughly classified into two: a method of rolling a slab a few times with use of roughers before the slab is fed into a finishing rolling mill train which it passes once to roll to a desired production thickness; and a method of feeding a slab into a finishing rolling mill train without rougher, to pass through the mill train only once to roll to a desired production thickness.

However, if the slab is too thick, there are limits on these methods. There can be no realistic facility that can feed a slab, for example of 200 mm thickness into the finishing rolling mill train to pass through the mill train once to roll, for example to 1.6 mm thickness because of requirements for keeping the rolling temperature high and increasing the rolling speed. Thus, it is necessary to install the roughers.

On the other hand, if the slab is thin, the roughers can be omitted, which can lower the facility cost and the production cost. As an example, JP-A-63-132703 discloses a method of making continuous the operations of the continuous casting process for casting the thin slab and the hot-rolling process without rougher. This document proposes a compact facility of casting a relatively thin slab for a medium-scale production of around a million tons per year. It disclosed that up to three or four rolling stands can continuously roll the slab. A first rolling stand has large-diameter working rolls to roll the slab, and a later rolling stand has working rolls and driven back-up rolls, and the slab is intermediately stored between the continuous casting process and the hot-rolling process.

However, in practice, as discussed more below, it is difficult to cast by the continuous casting process to produce a slab of around 50 mm in the slab thickness. Therefore, the facility disclosed in JP-A-63-132703 cannot satisfy the need that the strip required as a final product of the hot-rolling has to be not thicker than 2.0 mm.

The company SMS Schloemann-Siemag AG has published a proposal for a continuous casting and hot-rolling facility called CSP (compact strip production). The casting mould has a funnel shape, unlike the conventional parallel-sided mould. The aim of the funnel-shaped mould is to achieve a cast slab thickness as low as 50 mm. The funnel shape is necessary in order to accommodate the submerged casting nozzle in the mould. Since the solidified metal shell is deformed in such a funnel shape mould, its use brings in an extra requirement to ensure that stability of the casting process is maintained, and that break-out of molten metal does not occur.

In the CSP facility, furthermore, a soaking furnace of rather great length is arranged after the shears which cut the cast slab to length, in order to homogenize the slab temperature. One function of the long furnace is to provide for holding of the slabs at high temperatures, in the event of a temporary stoppage of the rolling mill train. This can be achieved by normally moving the slabs at a speed higher than the casting speed, so that there are gaps between the slabs which can close again if the rolling mill train stops. However the use of a long furnace, which is heated by combustion of fuel, makes the overall length of the facility large.

An alternative solution to these problems has been adopted in the mill installed by Mannesmann-Demag and Arvedi in Cremona, described in MPT-Metallurgical Plant and Technology, No. 2/1992. In this, the slab is cast at 60 mm thickness, and reduced in several roughing mill stands to 15 mm thickness. Because of the cooling occurring in this thickness reduction, a long induction heating stage follows, before the slab is coiled on a coiler mounted in a thermally insulated chamber. The coiler can hold two coils, and one coil is unwound into the hot-rolling train. This process requires a relatively large amount of energy to re-heat the slab after the roughing mill stands, and care is necessary to ensure that the steel does not cool to the $A_3$ temperature before the reheating. It is not possible to adapt the process by reducing the amount of thickness reduction before reheating, because the coiler cannot coil thicker slabs.

The following prior art documents are discussed below, in context: U.S. Pat. No. 5,133,205, JP-A-58-20301 and JP-A-61-176401.

SUMMARY OF THE INVENTION

One object of the present invention is to overcome or reduce the problems of the prior art discussed above, and in particular to provide a method and apparatus for continuous casting and hot-rolling in which the overall length of the continuous production line can be kept short and heat loss prior to reheating to hot-rolling entry temperature can be kept small.

At the same time, it is desirable to avoid the need for a special continuous casting technique, that is to say the apparatus should handle a cast slab of thickness for example in the range 60 to 200 mm.

In a first aspect the invention provides a method and apparatus in which an induction heating stage of heating towards the hot-rolling mill entry temperature is combined with a temperature-maintaining stage in a furnace for homogenization of temperature within the slab. Both these stages are performed on the slab at its casting thickness, i.e. no substantial thickness reduction takes place beforehand. The temperature-maintaining furnace may be heated by usually applied non-inductive heating to the slab.

The advantages resulting from this combination of the rapid heating provided by the induction-heating stage with the temperature-maintaining stage at high temperature (for example entry temperature to the hot-rolling mill train) are firstly that it permits shortening of the production line and secondly that high ductility of the slab emerging from the temperature-maintaining stage can be obtained in a relatively short production line. High ductility is beneficial in the hot-rolling. This high ductility is obtained by the homogenization of the crystallised structure of the steel. As described in more detail below, ductility is dependent both on the temperature reached in the reheating process and also the time for which the steel is maintained at that temperature. The rapid heating to high temperature provided by the induction heating permits the time of holding at high temperature to be relatively short, and yet the steel has excellent ductility. This means that the length of the temperature-maintaining furnace can be shorter.

For completeness it is mentioned that the use of induction furnaces to raise the temperature of a steel slab rapidly is known from conventional processes, in which the production is not continuous, but the slab is cooled to ambient temperature after continuous casting, stored and then reheated. Such a process is inefficient in energy use, and does not give the steel appropriate metallurgical properties for the hot rolling, because the length of the induction furnace is minimised, in order to save its high costs. If non-inductive heating is employed, the furnace must be very long. U.S. Pat. No. 5,133,205 for example shows in FIG. 11a a process involving induction heating only, with no holding time at high temperature, resulting in poor ductility. In FIG. 4a of the same document, there is disclosed a conventional reheater, but there is not discussion at all about the heating requirements.

A second object of the present invention is to provide a method and apparatus for continuous casting and hot-rolling, which is adapted to accommodate stoppages of the hot-rolling mill train, in order to permit the continued operation of the continuous caster, with low heat loss and energy consumption.

In its second aspect, the invention provides a method and apparatus in which off-line storage of a slab takes place in a thermally insulated storage chamber located alongside a thermally insulated zone through which the slab lengths travel in the production line between cutting means for the slab and the hot-rolling mill train. In the event of a stoppage in the operation of the hot-rolling mill train, at least one slab length is transferred laterally from the in-line thermally insulated zone to the off-line thermally insulated storage chamber.

The in-line thermally insulated zone may be a so-called adiabatic or soaking furnace or a holding furnace, in which heating of the slab length may take place.

An advantage of the invention in this aspect is shortening of the overall length of the production line, since it is not necessary to include capacity for holding slabs at temperature in the line itself, during a brief stoppage of the rolling mill train. By providing a heat-insulated store alongside the in-line thermally insulated zone, transfer can be effected between them with minimal heat loss, and the temperature of the slab can be maintained in the off-line storage chamber.

It is mentioned, again for completeness, that in the prior art arrangements have been suggested for off-line storage, in a continuous production line, but these known arrangements have provided storage at a different stage in the process, and not alongside a temperature-maintaining zone. See JP-A-58-20301 and JP-A-61-176401.

Typically the method and apparatus of the invention can employ a continuous caster which produces slab of thickness in the range 60 to 200 mm, more preferably 60 to 120 mm but the invention is not limited by these ranges. Such continuous casters are available now and do not provide special problems in operation.

As described in more detail below, it has been found that hot-rolling of slab of this thickness can advantageously be performed in a hot-rolling mill train in which at the entry end there is at least one two-high rolling mill stand. Such a stand has work rolls of relatively large diameter, by comparison with for example a four-high mill stand which may be used later in the rolling mill train.

BRIEF INTRODUCTION OF THE DRAWINGS

Embodiments of the invention will now be described by way of non-limitative example, with reference to the accompanying drawings, in which:

FIG. 3 is an enlarged cross-sectional view of the apparatus of FIG. 1 on the line A—A;

FIG. 4 is a side view of a second continuous casting and hot-rolling apparatus embodying the invention;

FIG. 21 is a diagrammatic side view of an alternative rolling mill train which can used in the apparatus of the invention;

FIG. 22 is a diagrammatic side view of another alternative rolling mill train which can be used in the apparatus of the invention;

DESCRIPTION OF THE PREFERRED EMBODIMENTS

Figure 1:
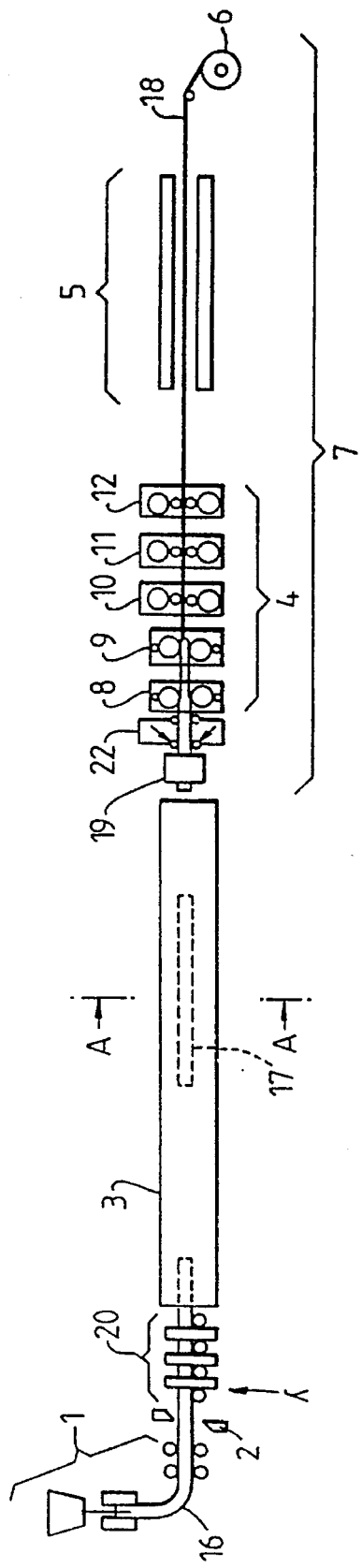
FIG. 1 is a diagrammatic side view of a first continuous casting and hot-rolling apparatus embodying the invention.

In the continuous casting and hot-rolling facility shown in FIG. 1, there is a continuous caster 1 for continuously casting a slab-shaped ingot 16 and a hot-rolling plant 7 having a finishing rolling mill train 4 including a plurality of rolling mills. In the facility also, there are arranged a cutter 2 for cutting off a dummy bar at the head of the ingot 16 cast by the continuous caster 1 and for cutting the ingot 16 to slabs 17 of desired length, an induction heating furnace 20 for heating the slabs 17, and a thermally insulated adiabatic furnace 3 through which the slabs 17 pass in one direction before being fed to the hot-rolling plant 7. The cutter 2 may be a gas cutter, which makes a cut transverse to the longitudinal direction of the cast slab.

The hot-rolling plant 7 has a width rolling mill 19 for adjusting width of the slab 17, a descaling arrangement 22 for removing scale from the surface of the slab 17, a strip cooling zone 5 for cooling a strip 18 after finish-rolling, and a down coiler 6, as well as the finishing rolling mill train 4.

The finishing rolling mill train 4 comprises five stand tandem mills, including a No. 1 stand 8, No. 2 stand 9, No. 3 stand 10, No. 4 stand 11, and No. 5 stand 12. The No. 1 stand 8 and the No. 2 stand 9 are both two-high rolling mills having large-diameter working rolls. The No. 3 stand 10, the No. 4 stand 11 and the No. 5 stand 12 are each four-high rolling mills.

Figure 2:
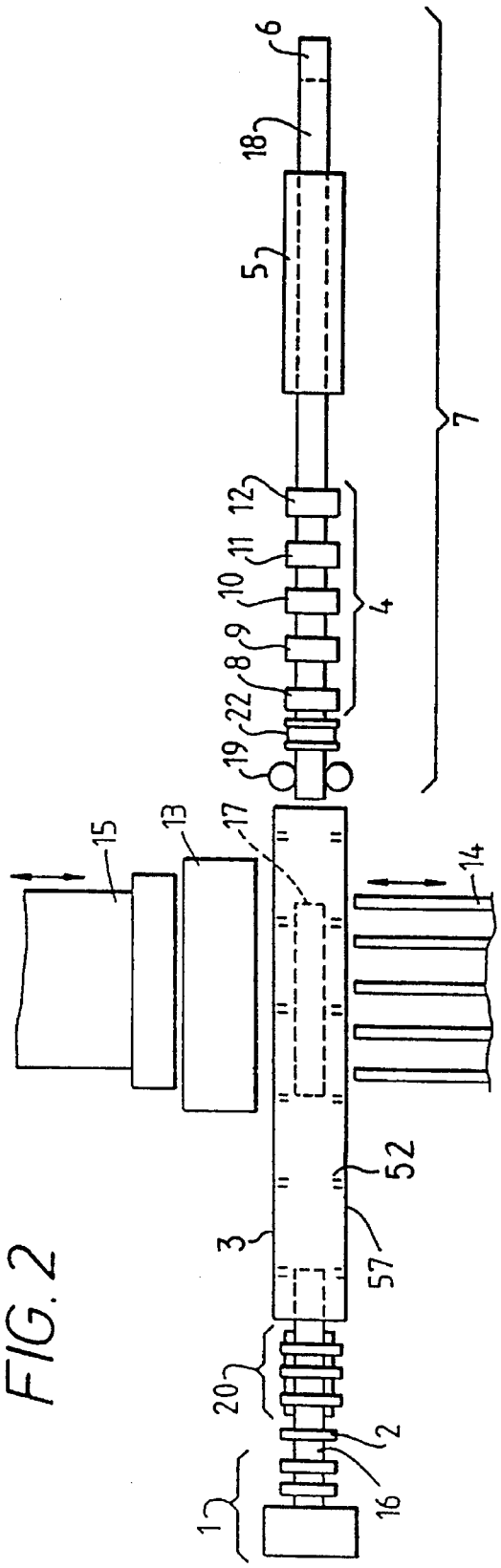
FIG. 2 is a plan view of the apparatus shown in FIG. 1.

FIGS. 2 and 3 show that on the left side of the adiabatic furnace 3 in the rolling direction there is arranged a thermally insulated heat retaining furnace 13 for storing the slabs 17 hot while intermediately storing them off-line between the continuous caster 1 and the hot-rolling plant 7. The heat retaining furnace 13 is used in the event of stoppage of the hot-rolling plant 7. The slab 17 is carried to and from the heat retaining furnace 13 while lifted up by a slab supporting arm 14 made of parallel bars. The slab 17 carried onto the heat retaining furnace 13 by the arm 14 is clamped by a slab clamping arrangement 15 in order to be lowered into the furnace 13.

Supporting rolls 52 are provided in the adiabatic furnace 3 and beneath them may be fuel-burning means e.g. gas burners 57, for heating the inside of the adiabatic furnace 3, e.g. when the adiabatic furnace 3 is started up or at a low temperature.

FIG. 3 illustrates in detail the transfer means for rejecting the slab, or carrying it from the casting line to the heat retaining furnace 13. The slab supporting arm 14 is held by supporting rollers 23 and 24 and moves perpendicular to the casting line. An arm lifting cylinder 32, on the other hand, can lift up the supporting rollers 24, so that the arm 14 is capable of floating the slab above the rollers (not shown in FIG. 3) of the casting line and carrying the slab toward the heat retaining furnace 13.

The adiabatic furnace 3 has doors 26A and 26B which are open only when the slab is carried between the heat retaining furnace 13 and the casting line, so that temperature decrease in the adiabatic furnace 3 can be minimized.

The furnace 13 also has a lid 27 to keep it hot. When the slab 17 is transferred, the lid 27 is opened or closed by a lid lifting arrangement 28.

The slab 17 in the heat retaining furnace 13 is laid on a slab retainer 31 by the clamp 15. The slab retainer 31 can carry a stack of slabs 17 as shown and is lifted up and down by worm jacks 30 for adjustment according to the number of the slabs stored. This is to minimize a space between the lid 27 and the slab retainer 31 to make the heat retaining effect high.

The heat retaining furnace 13 has a heating arrangement (not shown) provided therein to prevent the temperature of the slab 17 from decreasing during storing.

In this embodiment, it may not be needed to reheat the ingot if the temperature of the ingot is higher than a target ingot temperature at the entrance of the induction heating furnace 20. This may apply when the casting speed is 4.0 m/min. If the casting speed is lowered due to a failure on the hot-rolling plant 7 side, however, it is needed to reheat the ingot. If the casting speed is lowered to 2.5 m/min, for example, the temperature must be raised around 70° C. Reheating is needed also if the metal is cooled excessively prior to entry to the furnace 20. In such an event, the induction heating furnace 20 is used to reheat the ingot rapidly, prior to temperature homogenization in the furnace 3.

Figure 8:
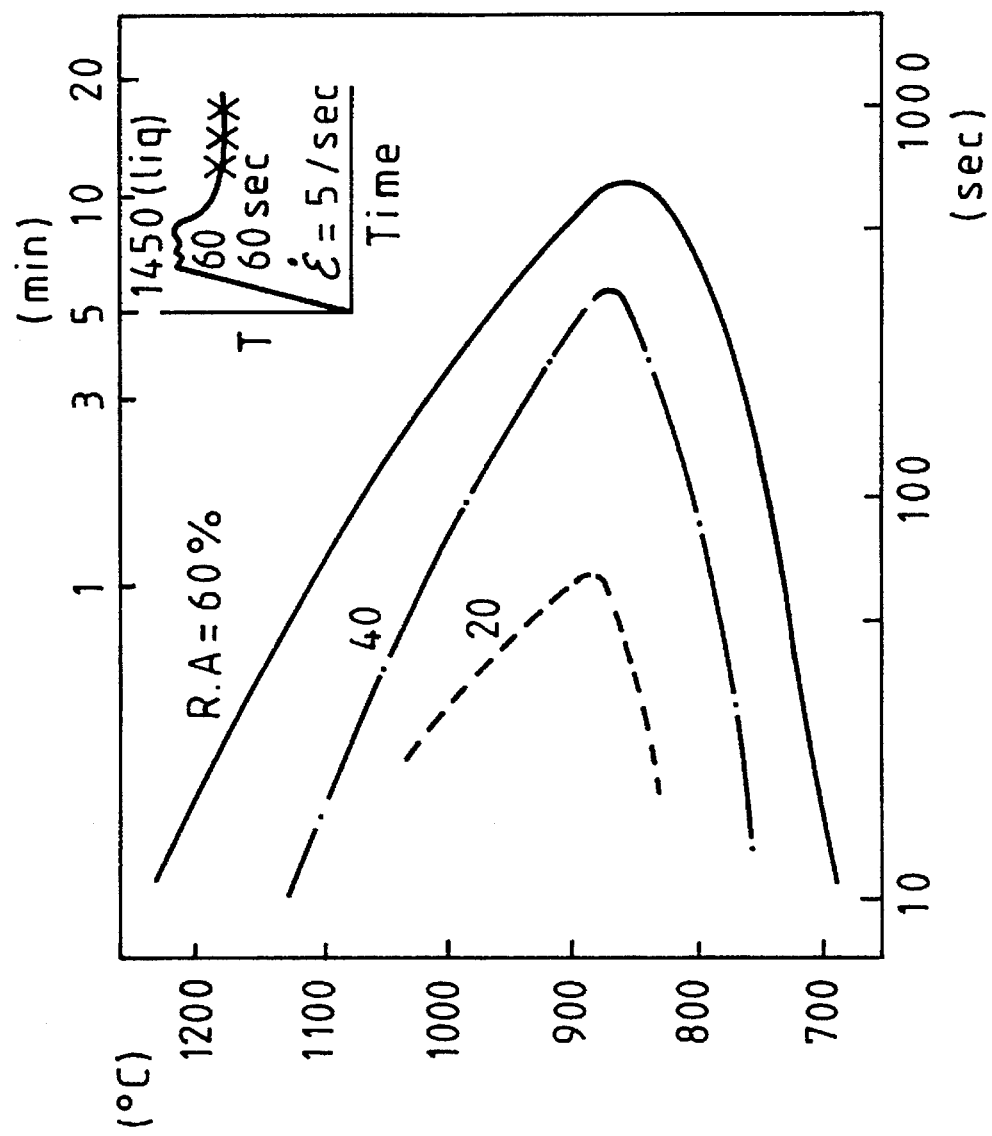
FIG. 8 is a graph plotting temperature against retaining time at temperature, for the purpose of illustrating ductility.

FIG. 8 is a graph plotting temperature required with respect to retaining time at the temperature, to obtain a reduction of area (RA) at rupture in a tensile test. This is a measure of ductility. Higher RA value means higher ductility. FIG. 8 shows the thresholds of 20% RA, 40% RA and 60% RA. The graph is cited from the article entitled "Brittle Characteristics of Various Steels Having Solidifying Structure at High Temperatures," Irons and Steels, Vol. 65, No. 14, FIG. 6, 1979. This article describes (1) embrittlement at melting point to 1,200° C., (2) embrittlement at 1,200° to 900° C., and (3) embrittlement at 900° to 700° C. In (2), the embrittlement at 1,200° to 900° C., saturated S and O present are deposited in the form of (Fe, Mn)S and (Fe, Mn)O on an austenitic boundary. If a tensile stress is applied to the material in such a state, the material has a lower ductility, and the deposited matter becomes larger at an isothermally retained temperature, which will not contribute to the embrittlement.

It can be seen in FIG. 8 that the material has high ductility as the reduction of area (RA) is high. The high ductility means that failure by cracking in the rolling is less. The retaining time needed for the reduction of area (RA) to become 60% is around 10 min at 900° C. material temperature and around 1.1 min at 1100° C. The retaining, therefore, should for example be made at around 1100° C. to obtain the material having higher ductility.

Therefore, it is desirable that slab 17 in the for heat retaining furnace is retained in a range of 1,000 to 1,200° C. for a certain period of time before being fed into the finishing rolling mill train 4.

As described above, if the casting speed is lowered or for other reasons, it is needed to reheat the ingot. The reheating should be made as early as possible to minimize the amount of heat required. Also, a distance between the continuous casting plant and the hot-rolling facility 7 has to be an economic length to obtain highly ductile material.

The arrangement of the induction heating furnace 20 immediately succeeded by the temperature-retaining adiabatic furnace 3 means that the slab can be heated rapidly and then held at high temperature. This improves ductility and permits the production line to be short.

It is thus desirable to use an induction heating furnace for rapid slab temperature increase. After increasing the slab temperature, the slab should be put in the heat equalizing furnace of adiabatic structure for suppressing radiation of heat from the slab in rolling so that the slab can be equalized at a rolling temperature with an economical, short facility.

Also, edges of the slab can be heated in the heat equalizing furnace to adjust temperatures at the edges. On the other hand, after homogenizing the slab in the heat equalizing furnace, it is effective to arrange a further heating furnace, such as an induction heating furnace, for adjusting the slab temperatures, including the edges temperatures.

Figure 5:
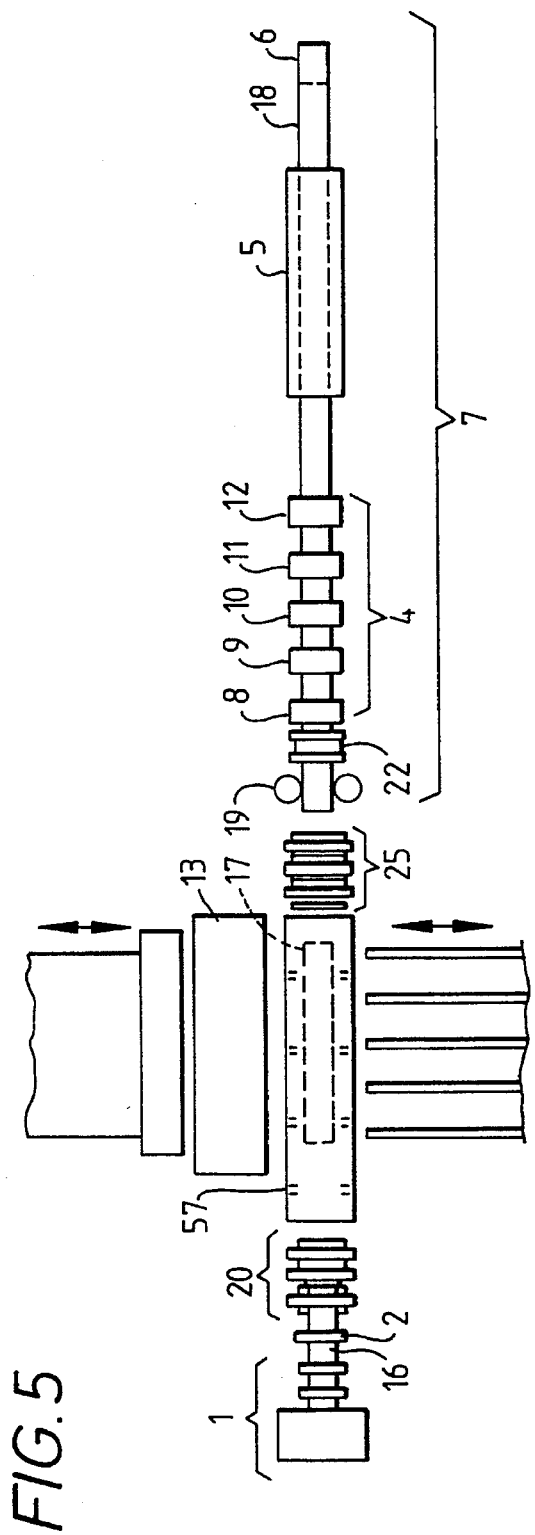
FIG. 5 is a plan view of the apparatus of FIG. 4.

The second embodiment shown in FIGS. 4 and 5 has an additional induction heating furnace 25 at an output position of the adiabatic furnace 3 of the first embodiment of FIGS. 1 and 2. The second induction heating furnace 25 reheats the slab 17 before feeding it into the hot-rolling plant 7 if the slab 17 carried from the heat retaining furnace 13 to the adiabatic furnace 3 needs reheating or if a slab 17 cannot reach the rolling temperature even after passing through the first induction heating furnace 20 and the adiabatic furnace 3 after casting.

Figure 6:
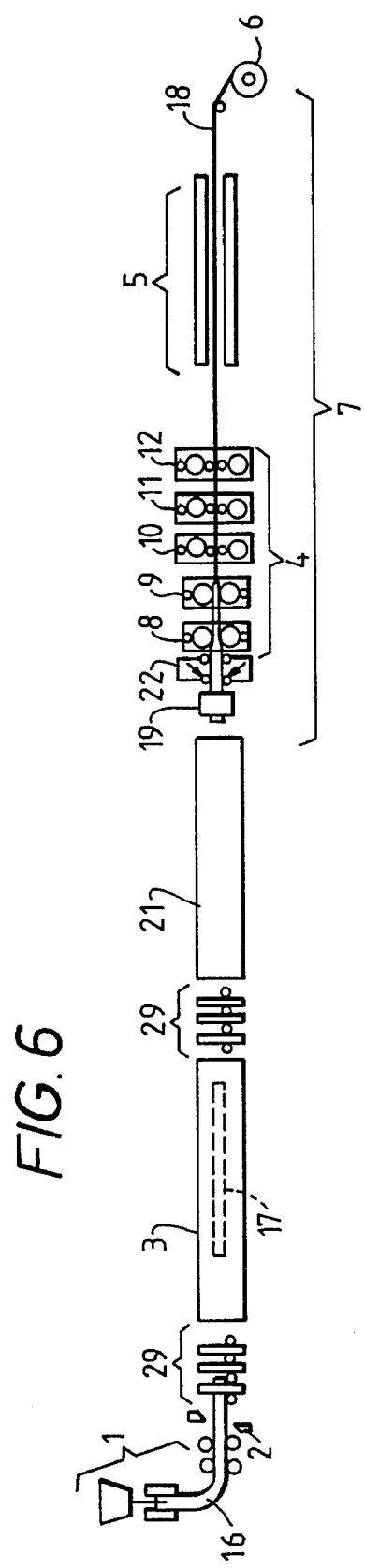
FIG. 6 is a diagrammatic side view of a third continuous casting and hot-rolling apparatus embodying the invention.
Figure 7:
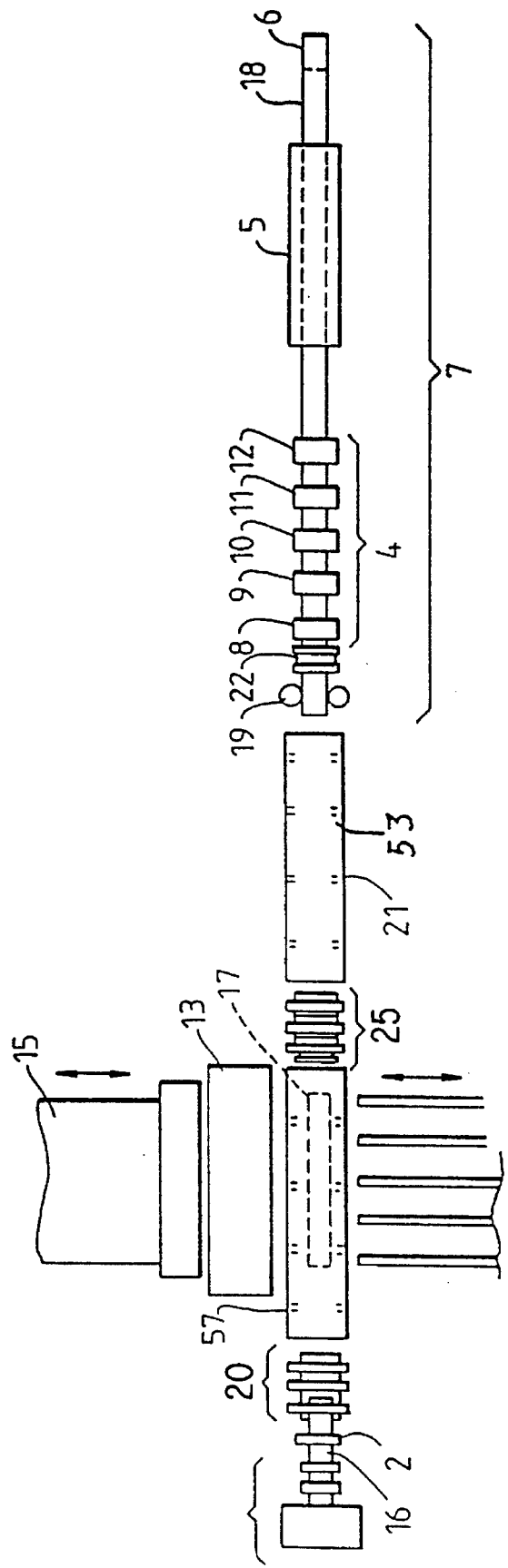
FIG. 7 is a plan view of the apparatus of FIG. 6.

The third embodiment shown in FIGS. 6 and 7 has an additional soaking pit 21 at an output position of the induction heating furnace 25 of the second embodiment of FIGS. 4 and 5. Supporting rolls 53 are provided in the soaking pit 21 and there are provided means for heating the inside of the soaking pit 21. The soaking pit 21 serves to make the slab temperature uniform, i.e. homogenization of temperature.

As described so far by reference to FIGS. 1 to 7, the first to third embodiments provide the feature that the slab 17 can be kept at the predetermined rolling temperature before being fed to the hot-rolling plant 7. Ductility is good, and the line is short.

Further explanation of the use of the heat-retaining furnace 13 will now be given. In accordance with one aspect of the present invention, the heat retaining furnace 13 is arranged between the continuous caster and the hot-rolling plant, outside the casting line, and alongside the casting line, and a transfer means is provided for carrying the slab between the casting line and the heat retaining furnace, thereby minimizing reheating of the slab efficiently between the continuous caster and the hot-rolling plant while giving a relatively short line length including an intermediate store. For example, the amount of intermediate storing can be made as much as 200 to 300 tons.

Suppose an event that, when a single electric furnace has a capacity of 200 tons/hour and a single ladle has a capacity of 200 tons, a serious problem arises in the downstream hot-rolling plant at around the middle in the casting cycle and it takes an extensive period of time to put right. The remaining melting steel in the ladle is around 100 tons, and the whole material in the electric furnace is virtually melted. The molten steel, therefore, is 300 tons in total. The molten steel of 300 tons can be intermediate-stored as slab. Thus, it is not needed to stop casting of the continuous casting facility. When the hot-rolling plant is recovered, the intermediate-stored slab can be carried from the heat retaining furnace to the casting line. If desired, each slab can be heated and heat-equalized to adjust to a rolling temperature before being fed to the hot-rolling plant.

Also, carrying the slab from the intermediate storing to the casting line can be made after casting or in a time scheduled by adjusting the casting speed in the course of casting. Even if a problem occurs in the hot-rolling plant, therefore, casting can be normally continued. That is, efficient continuous casting and hot-rolling can be achieved.

The intermediate slab storage also allows for a short stoppage of the hot-rolling plant, which may be planned, e.g. for roll-changing, as described below.

Figure 9:
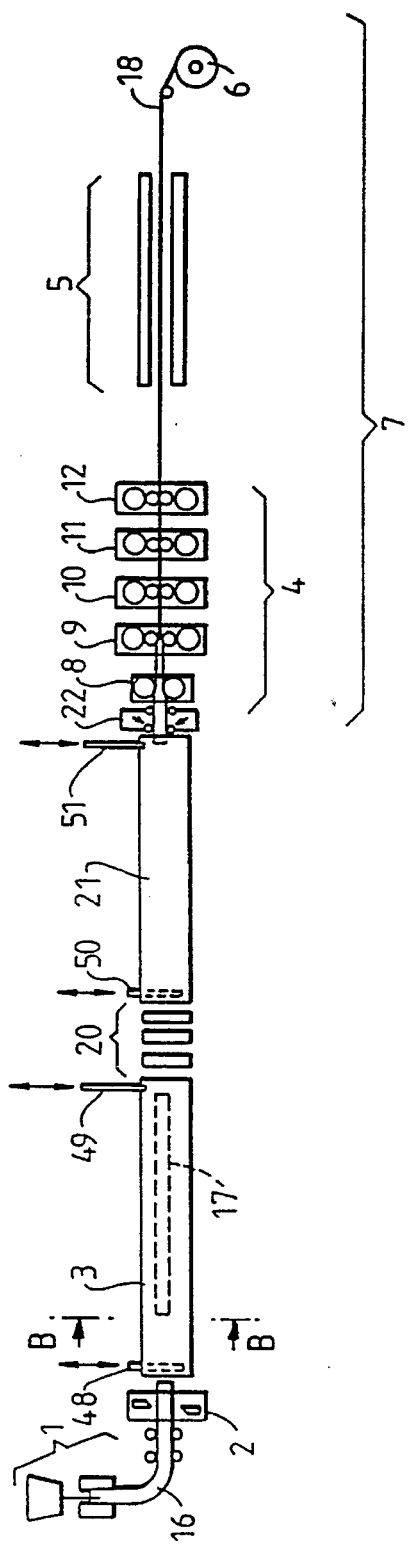
FIG. 9 is a diagrammatic side view of a fourth continuous casting and hot rolling apparatus embodying the invention.
Figure 10:
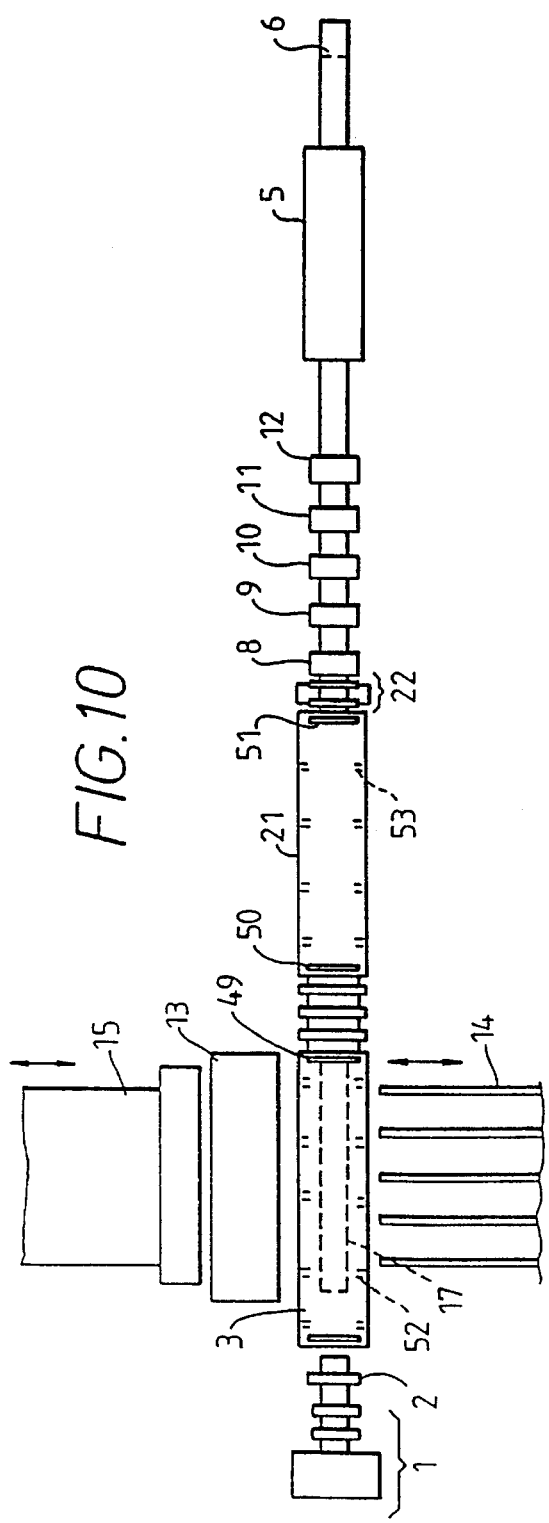
FIG. 10 is a plan view of the apparatus shown in FIG. 9.

FIG. 9 depicts a fourth embodiment of the present invention of a continuous casting and hot-rolling apparatus having steel-making and rolling coupled directly. Parts already described above have the same reference numbers and will not be described again. Downstream of the cutter 2 is an adiabatic furnace 3 for removing the cut-out dummy bar section from the line and feeding the slabs 17 forward in an adiabatic state. This is followed by the induction heating furnace 20 for heating the slabs 17, and a heat equalization furnace 21 for making temperature of the slabs 17 uniform, a descaling apparatus 22 for removing scale from surfaces of the slabs 17, a finishing rolling mill train 4 having a finishing rolling mills 8 to 12, a strip cooling zone 5, and a down coiler 6. Doors 48, 49, 50 and 51 are provided for selectively closing the adiabatic furnace 3 and the heat equalization furnace 21.

In this case the finishing rolling mill train 4 is a tandem mill having five stands. The No. 1 stand 8 is a two-high rolling mill having large-diameter working rolls. The No. 2 to stand 9 to the No. 5 stand 12 are four-high rolling mills.

Figure 11:
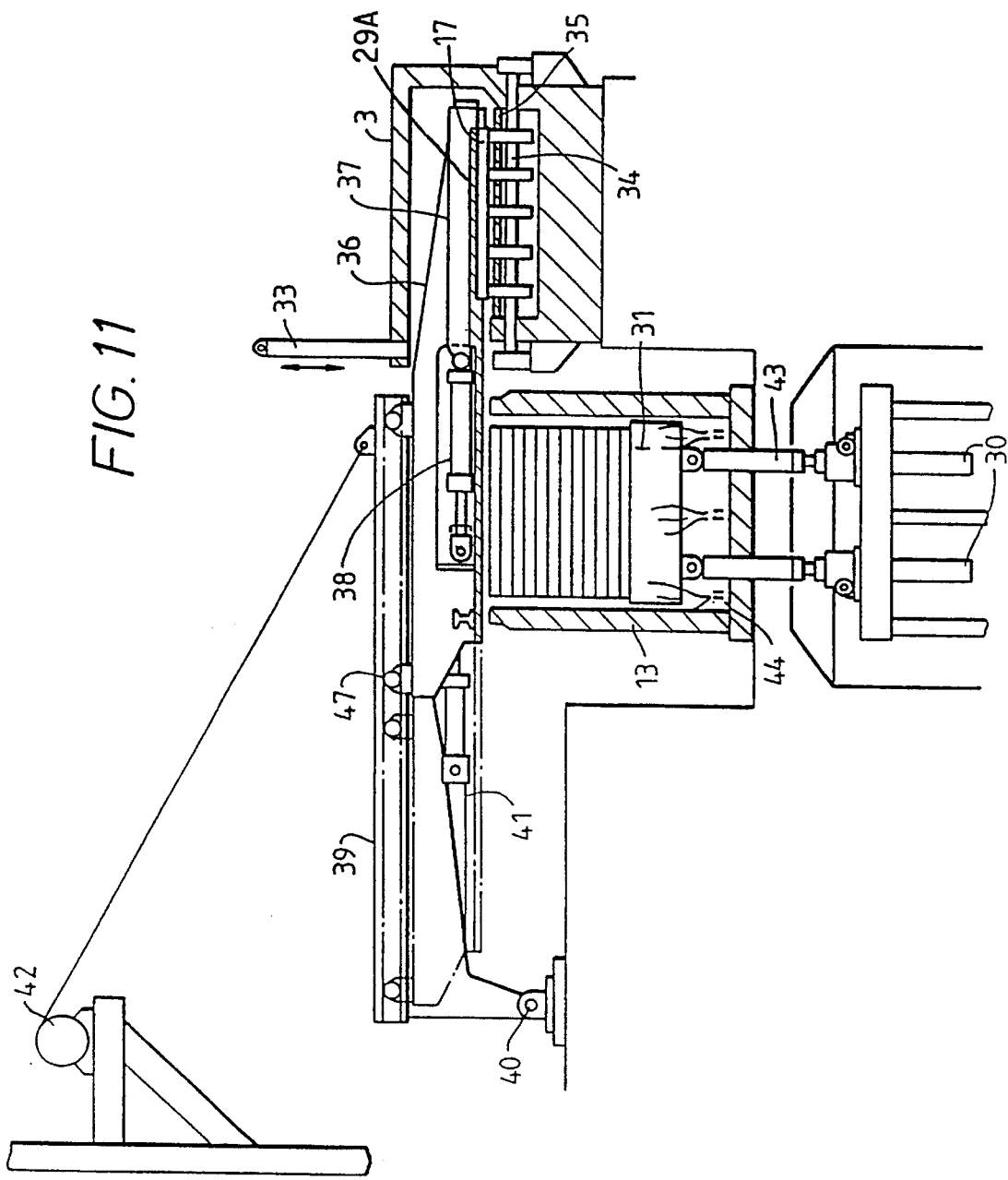
FIG. 11 is a enlarged sectional view on line B—B of FIG. 9 showing an alternative construction of a transfer mechanism and off-line storage chamber.

FIG. 11 depicts a second method and structure of transferring a slab, alternative to that of FIG. 3. The slab 17 on rollers 34 in the adiabatic furnace 3 is clamped in that an arm cylinder 38 mounted on frames 36 moves the arm 37 in the frames 36. After clamping, a frame lifting device 42 lifts up the frames 36 a little through a supporting frame 39 around a fulcrum 40. A frame cylinder 41 pulls the frames 36 toward to the heat retaining furnace 13 on rolling wheels 47, to carry the slab 17 into the heat retaining furnace 13. Then, the frame lifting device 42 lowers the supporting frame 39 to put the carried slab on the slab retainer 31 or on an already-stored slab.

After transfer of the slab 17, the door 33 is moved downward to prevent heat loss from the adiabatic furnace 3.

Burners 44 are provided in the heat retaining furnace 13 to heat the inside of the heat retaining furnace 13. The slab retainer 31 and the already-stored slab in the heat retaining furnace 13 are lifted up and down by the worm jacks 30 through connection bars 43. The worm jacks 30 are arranged in a separate chamber below the heat retaining furnace 13 for convenience of maintenance.

The frames 36 have a heat retaining furnace cover 29A attached thereto. If the frames 36 are moved toward the adiabatic furnace 3, the cover 29A covers the top of the heat retaining furnace 13. If the slab 17 is carried onto and lowered down into the heat retaining furnace 13, the heat retaining furnace cover 29A fully closes the heat retaining furnace 13.

Figure 12:
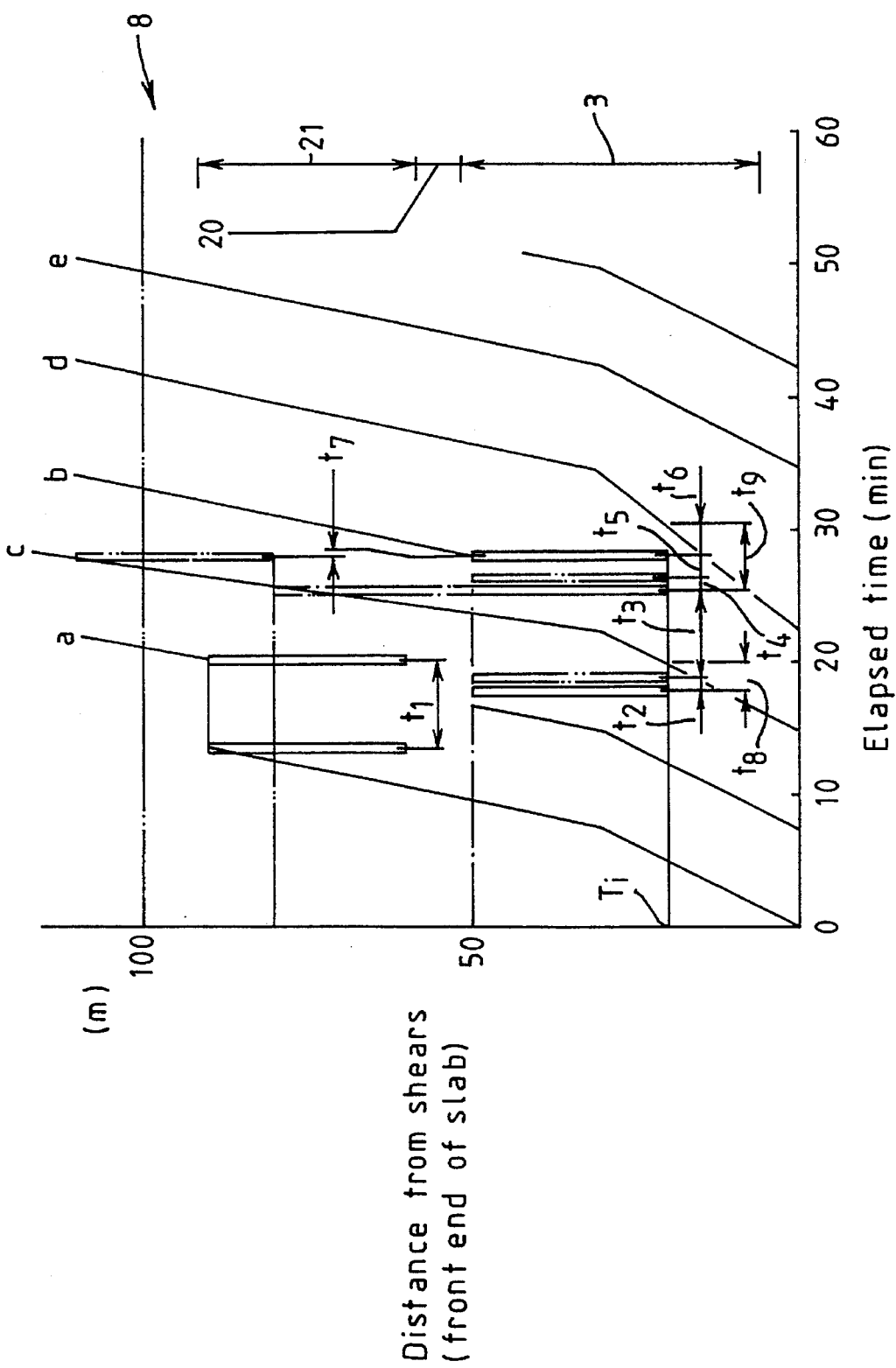
FIG. 12 is a graph plotting distance along the production line from the shears against elapsed time, illustrating the movement of slabs along the production line.

FIG. 12 is a graph illustrating distances of leading ends of the slabs from the cutter 2 with respect to an elapsed time. The graph shows a method of securing times for replacing the rolls and for maintenance on and after the rolling line.

In FIG. 12 symbols a, b, c, d, e indicate the slab numbers.

The cast slab is cut while moving at 4 m/min before being fed to the hot-rolling plant 7 at 10 m/min.

In FIG. 12, when a stoppage occurs in the downstream hot-rolling plant 7, the slab a is held in the heat equalization furnace 21 for time $t_1$. The following slab b cannot go forward. The slab b, then, is transferred to the heat retaining furnace 13 during time $t_2$ and stored in the heat retaining furnace 13 for time $t_3$. Then, the slab b is carried from the heat retaining furnace 13 to the adiabatic furnace 3 during time $t_4$. Thus, the slab c overtakes the slab b while the latter is in the heat retaining furnace 13. To allow time to carry the slab b from the heat retaining furnace 13 to the casting line, the speed of the slab d is lowered to 2.5 m/min. For the case that the slab is held in the heat equalization furnace 21 for such a short period as time $t_1$, the heat equalization furnace 21 is made sufficiently long that one slab can enter therein. Whether the slab in the adiabatic furnace 3 is to be fed toward the heat equalization furnace 21 or not depends on whether time $t_7$ is positive or negative when the rear end of the preceding slab is at position C and the front end of the following slab is at position B.

If time $t_7$ is negative and if after that, a problem arises in the hot-rolling facility 7 suddenly, the slab bridges over the adiabatic furnace 3 and heat equalization furnace 21 and is prevented from going on. This keeps the slab from being rejected in the adiabatic furnace 3. Thus, if time $t_7$ is positive, or if the end of the preceding slab reaches position C, the following slab is fed from the adiabatic furnace 3 toward the heat equalization furnace 21.

Let $t_8$ be a time taken to judge whether rejection to the furnace 13 is required in connection with the following slab. The rejection can be judged when $t_6$ becomes $t_8$, even if $t_7$ is waited until this becomes positive.

Under the conditions $t_5>0$ and $t_6>t_8$, when $t_7>0$ it is judged that the slab can be carried from the heat retaining furnace 13 to the casting line. After this transfer to the casting line, if there is a delay ahead, and after a time $t_7$ is negative when $t_6$ equals $t_8$, it can be judged that re-rejection is necessary.

Figure 13:
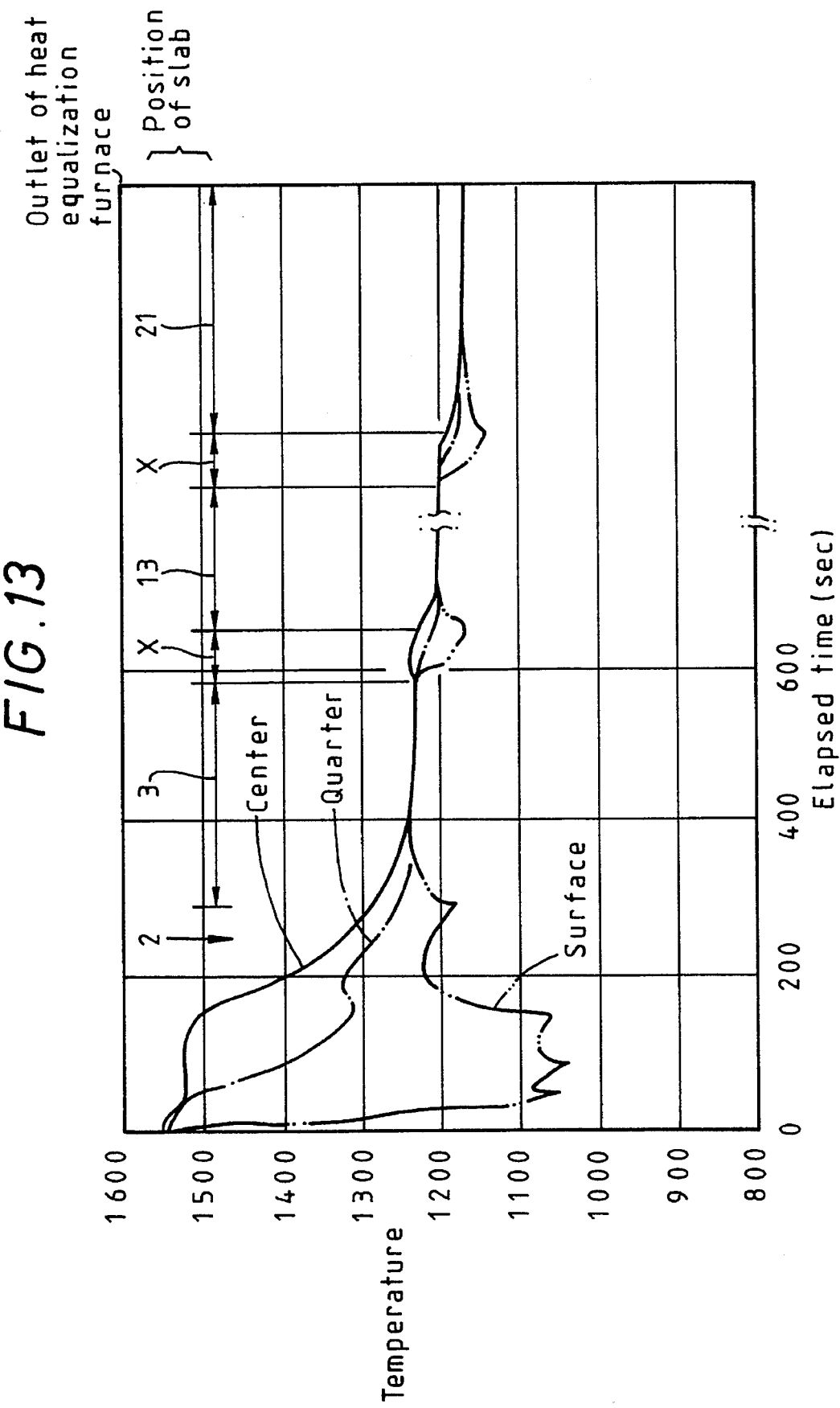
FIG. 13 is a graph plotting the temperature of points in a slab against elapsed time after commencement of casting.

FIG. 13 is a graph showing changes of temperature of a slab. The figure illustrates a case that after casting, the slab of 80 mm thick cast at speed of 4 m/min is transferred to the heat retaining furnace 13 in the course of passage to the hot-rolling. In this case, the slab temperature at the outlet of the heat equalization furnace 21 which is also the inlet of the hot-rolling plant 7 is 1170° C., i.e. sufficient to roll the slab. FIG. 13 shows the temperatures at the slab surface, quarter depth and center, as indicated. In FIG. 13, the regions X are the transfer to and from the furnace 13.

Figure 14:
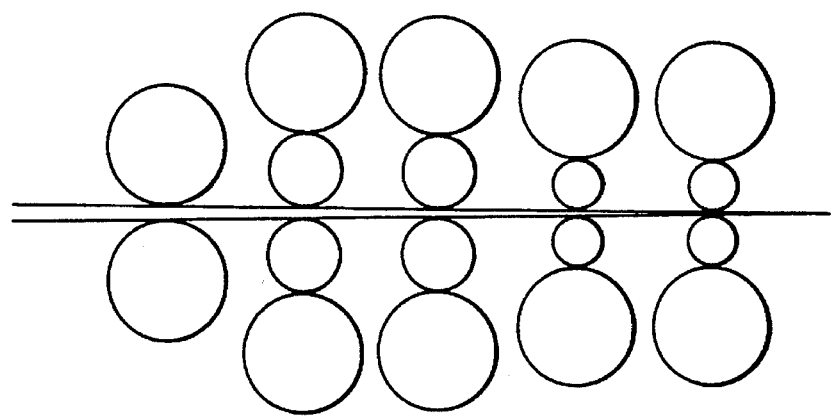
FIG. 14 is a diagrammatic side view illustrating the roll sizes of a finishing rolling mill train which can be employed in embodiments of the invention.
Figure 15:
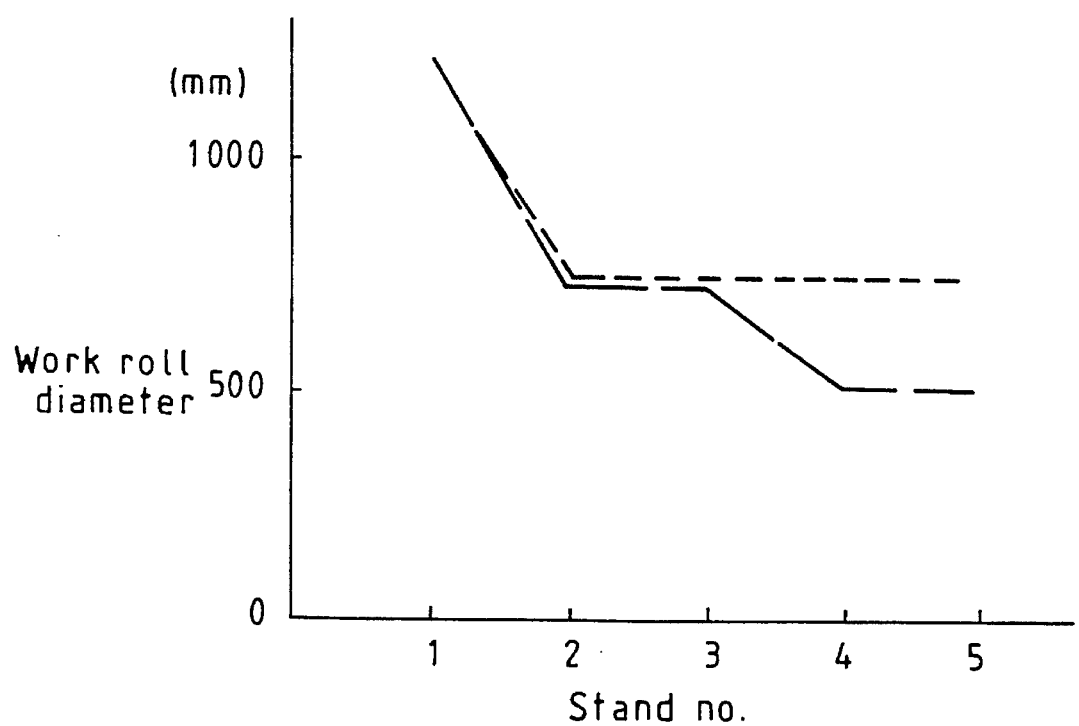
FIG. 15 is a graph illustrating the working roll diameters of the mill train of FIG. 14.
Figure 16:
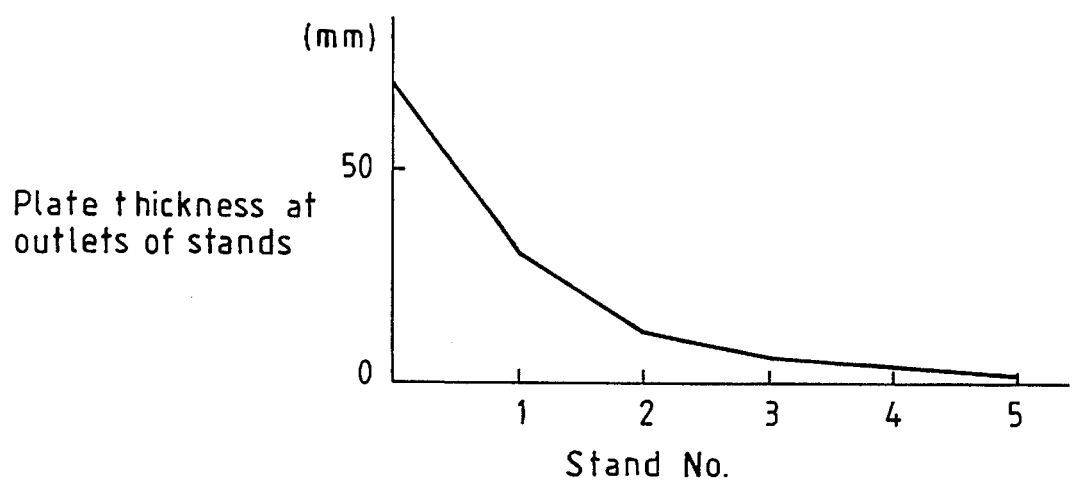
FIG. 16 is a graph illustrating the plate thickness at the outlets of the stands of the mill train of FIG. 14.
Figure 17:
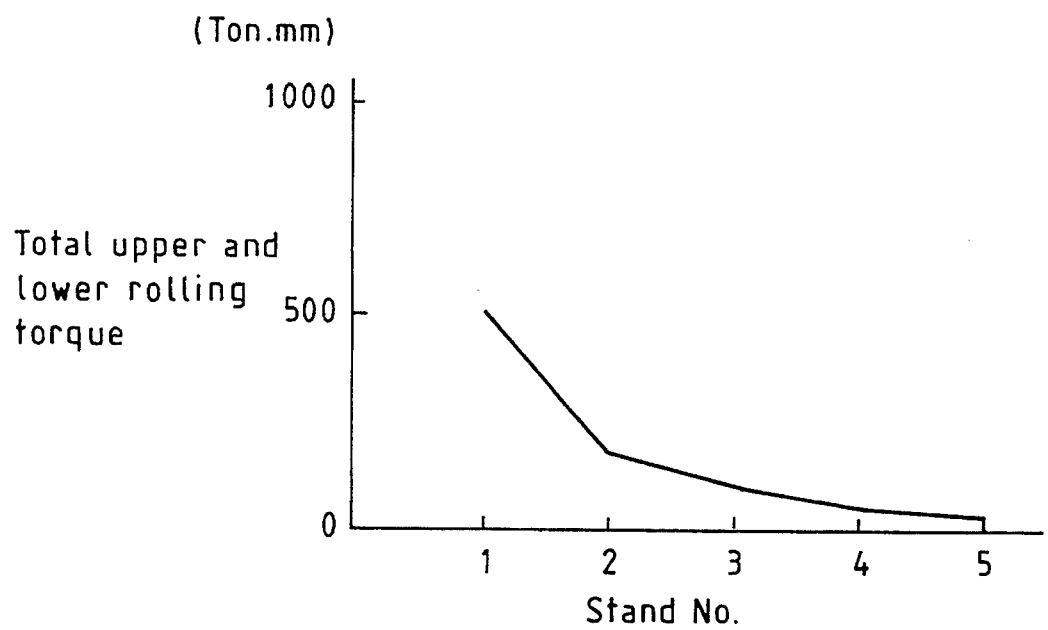
FIG. 17 is a graph illustrating the rolling torques in the stands of the mill train of FIG. 14.
Figure 18:
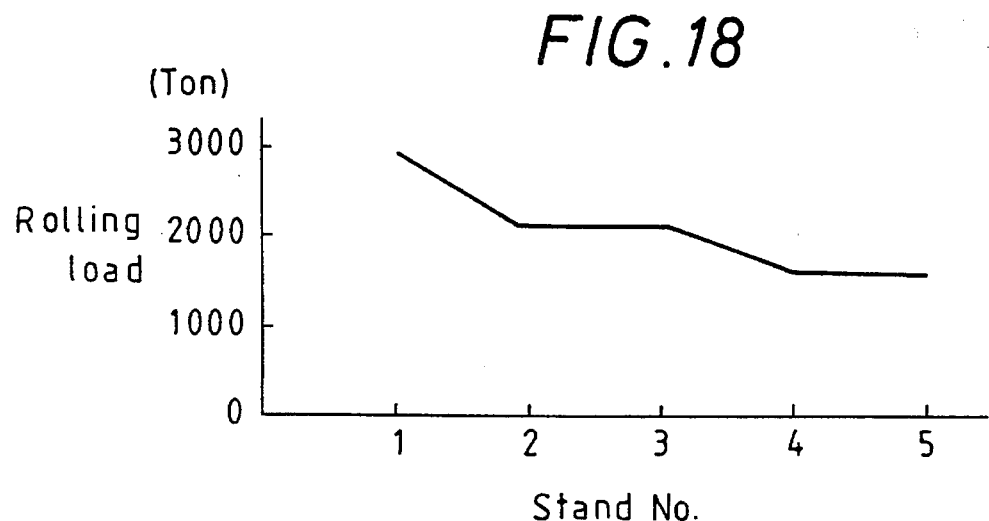
FIG. 18 is a graph illustrating the rolling loads in the mill stands of the mill train of FIG. 14, when rolling according to the rolling schedule of FIG. 16.
Figure 19:
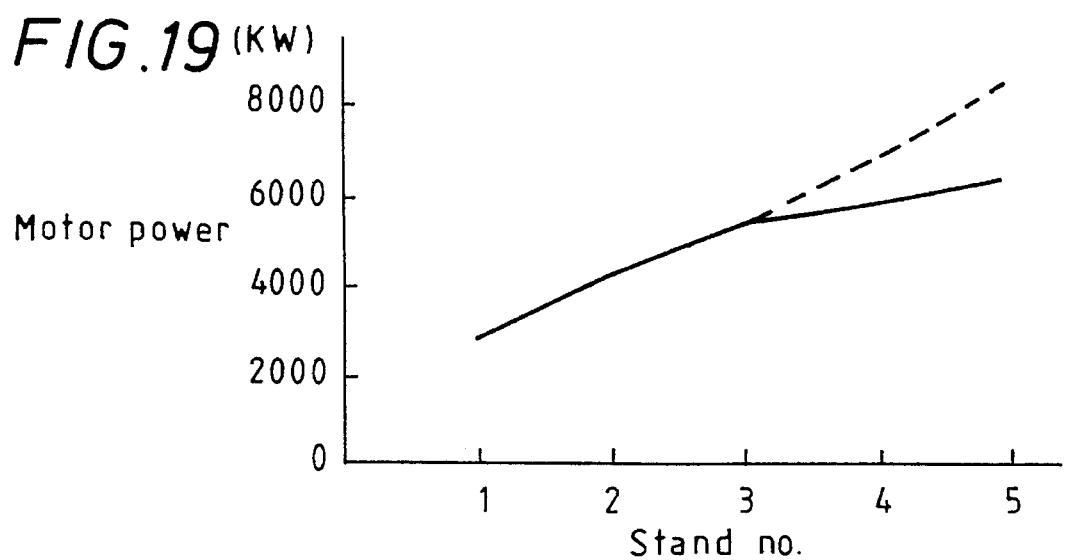
FIG. 19 is a graph illustrating the different motor powers required in the stands of the mill train of FIG. 14, when rolling according to the schedule of FIG. 16.

FIGS. 14 to 19 will now be described. FIG. 14 shows an embodiment of roll sizes of the finishing rolling mill train 4. FIG. 15 shows the work roll diameters at the stands in FIG. 14. The solid line in FIG. 15 shows the work roll diameters in FIG. 14 itself, and the dashed line is the case where the work roll diameters of No. 2 to 5 stands are all the same. FIG. 16 is an example of a rolling schedule by the finishing rolling mill train 4 in FIG. 14. FIG. 17 illustrates total upper and lower rolling torques in the rolling schedule in FIG. 16. FIG. 18 illustrates rolling loads of the stands in the rolling in the rolling schedule of FIG. 16. FIG. 19 illustrates motor powers of the stands in the rolling schedule of FIG. 16. The solid line shows the motor powers in FIG. 14 itself, and the dashed line is those for the case of same work roll diameters of the No. 2 to 5 stands.

If the slab cast at 70 mm thick is rolled to 1.6 mm as shown in FIG. 16, the five rolling mills are arranged as shown in FIG. 14. The No. 2 and 3 stands have the same work roll diameters. The No. 4 and 5 stands have the same work roll diameters. The No. 2 and 5 stands have the same size of reinforcing rolls. Thus, the number of types of rolls used is made as few as possible.

Note that as shown in FIG. 19, the solid line for the pattern of gradually decreased work roll diameters can make the motor power less as compared with the dashed line for the case of uniform same work roll diameters of No. 2 to 5 stands.

In the schedule in FIG. 16, rolling is made at relatively high pressures. To obtain desired plate crown and plate shape of the given sheet, the finishing rolling mill train 4 in FIG. 14 has rolling mills of the roll crossing type (described below) or roll axial-shifting type (not shown) capable of controlling the plate crown and plate shape.

Figure 20:
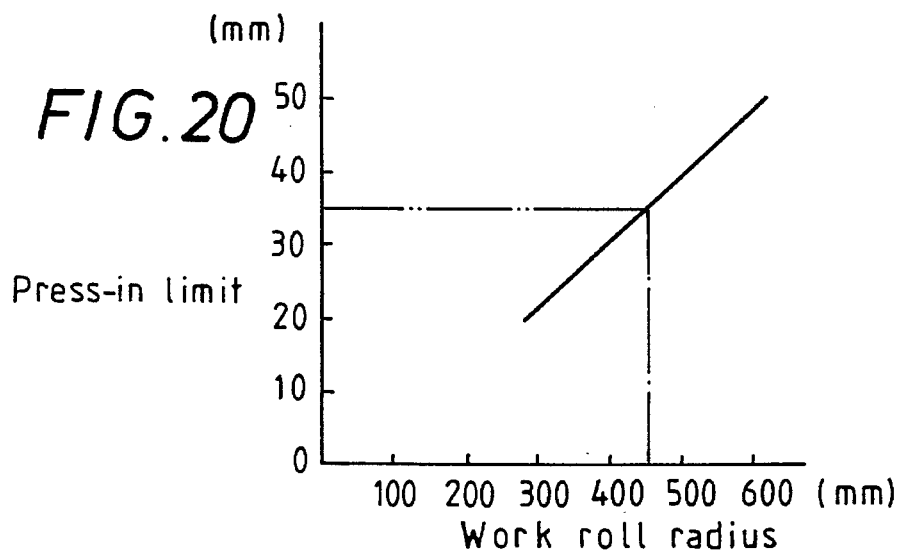
FIG. 20 is a graph illustrating the relationship between the press-in limit and the work roll radius.

FIG. 20 is a graph illustrating press-in limit (limit of thickness reduction) with respect to the work roll radius. As the slab thickness is mostly not thinner than 50 mm, it is proposed here that the press-in limit of the No. 1 stand should be around 35 mm and the work roll diameter should be not less than 900 mm.

The principle of the rolling mill train and method of FIGS. 14 to 20 will now be described more generally.

In order to minimize the number of rolling times in rolling the slab of for example 150 mm or thinner, thickness reduction must be made as high as possible. Let the thickness reduction be denoted by $\Delta H$, the rolling load by P, the stiffness coefficient of the rolling mill by K, and the radius of the work roll by R. Then, a friction coefficient $\mu_1$ at critical limit of slipping is given by Eq. 1 below. Eq. 1 thus gives the limit of thickness reduction.

$$\mu_1 = \sqrt{\left( \Delta H + \frac{P}{K} \right) / R} \tag{1}$$

In accordance with Eq. 1, the rolling pressure $\Delta H$ can be made higher with increasing radius R of the work roll. Therefore, the thickness reduction can be made high if at least one two-high rolling mill having work rolls of relatively large diameter is arranged at the front of the rolling mill train, for a thick sheet.

Typically, a continuous caster cannot continuously cast at higher than 4 m/min stably. If rolling is synchronized with that casting speed, the temperature decrease of the sheet to be rolled in operation limits the allowable thickness reduction to a great extent. If the slab of 150 mm thick is rolled to 2 mm thick, for example, the output speed of the rolling mill is as low as 300 m/min. At such a low speed, the temperature decrease of the sheet makes rolling impossible. To achieve satisfactory rolling, the input speed of the rolling mill has to be two or more times the casting speed. Therefore, the cast ingot is cut, during its supply from the continuous caster to the finishing rolling mill. Even if a very thin ingot can be cast for synchronous rolling with the casting speed without the problem of rolling temperature decrease, the maximum casting speed for even an ingot of 50 mm thick, for example, still cannot be made higher than 4 m/min. The production rate is then one third of that of the ingot of 150 mm thick. Two or three continuous casters may be needed depending on the production rate. If a plurality of continuous casters are used for producing the cast ingots, the cast ingots cannot be supplied from the continuous casters to the finishing rolling mill unless they are cut.

FIG. 21 depicts in side view a hot-rolling plant 7 for use in an apparatus of the invention having steel making and rolling coupled directly. This hot-rolling plant 7 may replace the corresponding plant for example in FIGS. 1, 4, 6 and 9. The slab 17 is shown emerging for example from the heat equalization zone 21 for making temperatures uniform of FIG. 9. The Figure shows a descaling apparatus 22 for removing scale from surfaces of the slabs 17, and a hot-rolling plant 7 formed of a finishing rolling mill train 4, a strip cooling zone 5, and a down coiler 6. The finishing rolling mill train 4 is a tandem mill having six stands, including a No. 1 stand 8, a No. 2 stand 9, a No. 3 stand 10, a No. 4 stand 11, a No. 5 stand 12, and a No. 6 stand 13. An inlet width rolling mill 14 is on the input side of the No. 1 stand 8, and a second width rolling mill 15 is put between the No. 1 stand 8 and the No. 2 stand 9. The No. 1 stand 8, the No. 2 stand 9, and the No. 3 stand 10 are each a two-high rolling mill having large-diameter working rolls. The No. 4 stand 11, the No. 5 stand 12, and the No. 6 stand 13 are each a four-high rolling mill.

In the mill roll stands, including the No. 1 stand 8, the No. 2 stand 9, and the No. 3 stand 10, in addition to the initial crown of the rolls, the rolls can be arranged to cross their axes to make a desired plate crown.

Figure 23:
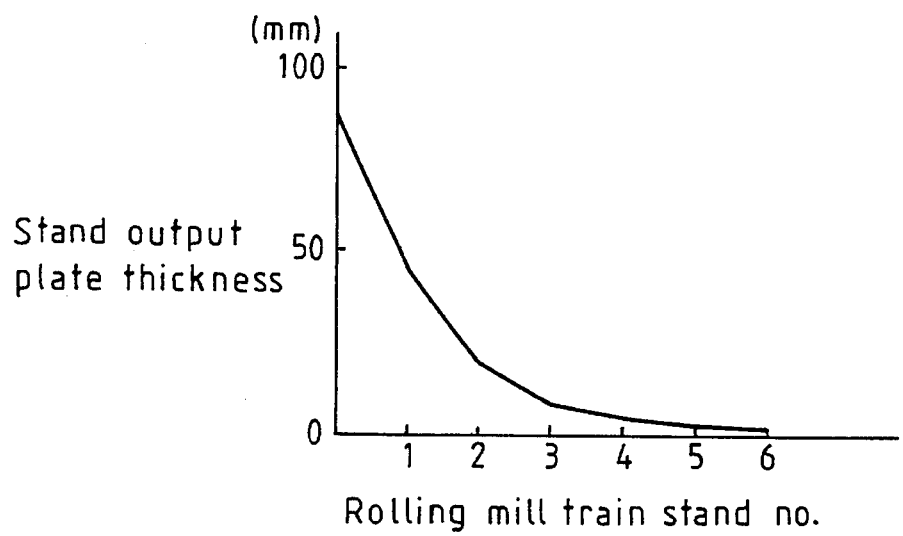
FIG. 23 is a graph illustrating the thickness reduction in a rolling mill train such as shown in FIG. 22, when rolling strip of 1.6 mm thickness from a slab 90 mm thick, in six roll stands.
Figure 24:
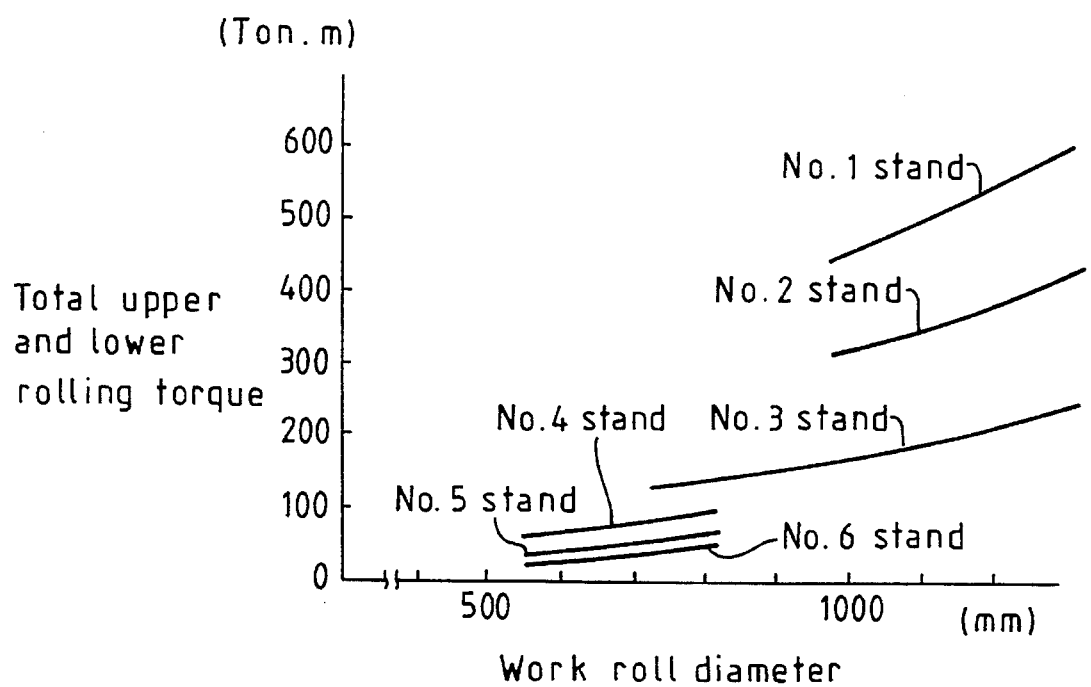
FIG. 24 is a graph showing rolling torque against work roll diameter, in the rolling schedule of FIG. 23.
Figure 25:
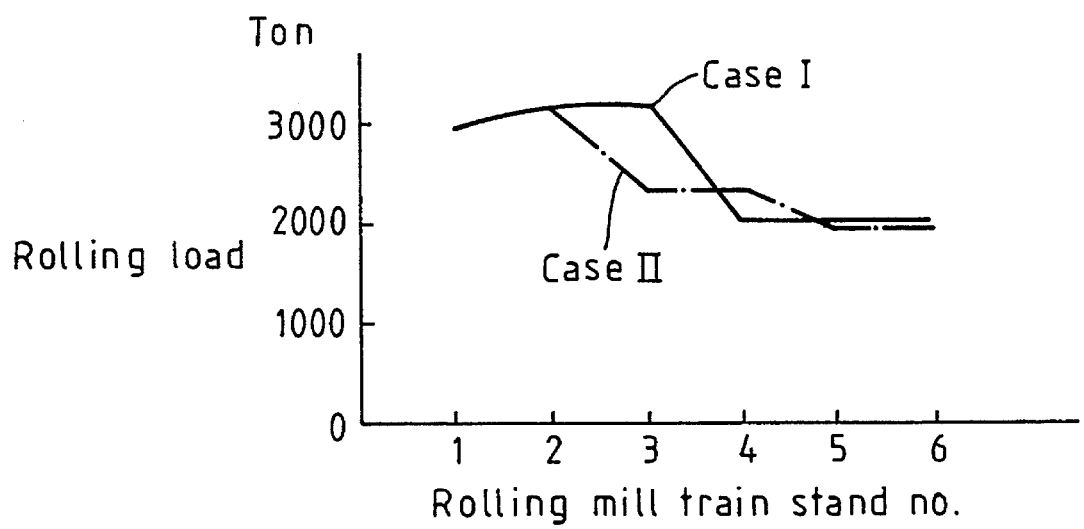
FIG. 25 is a graph illustrating rolling load in the respective rolling mill stands when rolling according to the schedule of FIG.

FIG. 23 is a graph illustrating an example of a rolling schedule for obtaining a strip of 1.6 mm from a slab of 90 mm thick by rolling in a single pass through the six mill stands. FIG. 24 shows characteristic curves of total upper and lower rolling torque to working roll diameter of the stands in the rolling schedule of FIG. 23. FIG. 25 shows characteristic curves of rolling load of the stands in the rolling schedule in FIG. 23.

In FIG. 23, the term P/K in Eq. 1 given above for the No. 1 stand 8 is around 6 mm and the thickness reduction (press-down) ΔH is 45 mm. If the friction coefficient $\mu_1$ at the press-in limit is 0.3, the work roll radius R is 455 mm. A work roll of larger than 910 mm in diameter can perform rolling well at this press-in limit. Work rolls of around 1100 mm in diameter can thus form the two-high rolling mill. The finishing rolling mill train 4 of FIG. 24 can roll the slab 17 of around 90 mm thick to a strip 18 of around 1.6 mm thick by a single pass in one direction.

As shown in FIG. 22, the No. 1 and 2 stands which have to perform a large amount of thickness reduction need a very high total upper and lower rolling torque. The work roll of 1100 mm in diameter needs 500 ton-m of the total upper and lower rolling torque. The drive spindle diameter needed is around 950 mm. The rolling load is around 3000 tons. This can be supported by a bearing for the work roll. Thus, the two-high rolling mill can be used in practice.

It is possible to select the work roll diameter of around 900 mm in view of the total upper and lower rolling torque. However, this involves the following problems. If the work roll diameter is reduced from 1100 to 900 mm, the rolling load can be reduced by around 10%. However, even if the bearing for the work roll is designed to have an appropriate balance, if the work roll bears the rolling load, the strength of the roll spindle of the bearing section is reduced by around 30% and also, that of the rotating bearing is reduced by around 30%. In such a state, the work roll cannot accept the rolling load, so that the two-high rolling mill cannot be used. To do so, a reinforcing or back-up roll of further large diameter has to be arranged in the rear of the work roll. Such a structure having the work rolls of large diameter and the reinforcing rolls of large structure is large and complicated. Thus, the two-high rolling mill having the large work roll diameter, sufficient that the bearing is able to bear the rolling load, provides such benefits as reducing the number of rolls and simplifying and making the structure smaller.

Further, as shown in FIG. 25, the No. 3 stand 10 can be either a two-high rolling mill or a four-high rolling mill. In particular, if the No. 3 stand 10 is a two-high rolling mill, the working rolls for the No. 4, 5, and 6 stands can be made of relatively small diameter in the same range. Thus, the No. 1 to 6 stands can be made of economical rolling mills.

Alternatively, the continuous casting and hot-rolling plurality can include two to four two-high rolling mills, to have seven mills in total. The facility, then, can roll a slab of 150 mm thickness to a finally finished plate of 1.6 mm thick in one pass.

When a two-high rolling mill is used for rolling, the plate is deflected by the rolling load of the roll to have a cross-section which is thicker in the middle. For this reason, in conventional processes, a roll initial crown has been used to form a desired plate crown. However, the usual technique involves such defects that the roll control is complicated and that the productivity is low because of roll replacement. Thus, to solve such problems, it is practically effective that the two-high rolling mill itself should be a rolling mill capable of controlling the plate crown.

One of methods for the two-high rolling mill itself to control the plate crown is that the axes of the upper and lower rolls are turned point-symmetrically from the center line of the rolling mill in a horizontal plane, i.e. that the rolls are made to cross. The plate crown can be adjusted when the rolls are mounted in the rolling stand. For example, the plate crown is changed with change of the rolling load of each of the stands as the finally finished plate thickness is changed. To deal with this, the amount of crossing should be set before rolling is started so that the plate crown can be set up for each of the slabs. Also, if the amount of crossing is changed during rolling, the plate crown can be adjusted between the stands. On the other hand, as described above, we may arrange a two-high rolling mill as each of the No. 1 to 3 stands. Also, it is a more practical method, when emphasis is placed on the high pressure, that the two-high rolling mill whose rolls have axes crossing as described above should be positioned in the No. 2 and 3 stands, while the No. 1 stand should have the usual roll initial crown only, as it rolls the thick plate.

Figure 26:
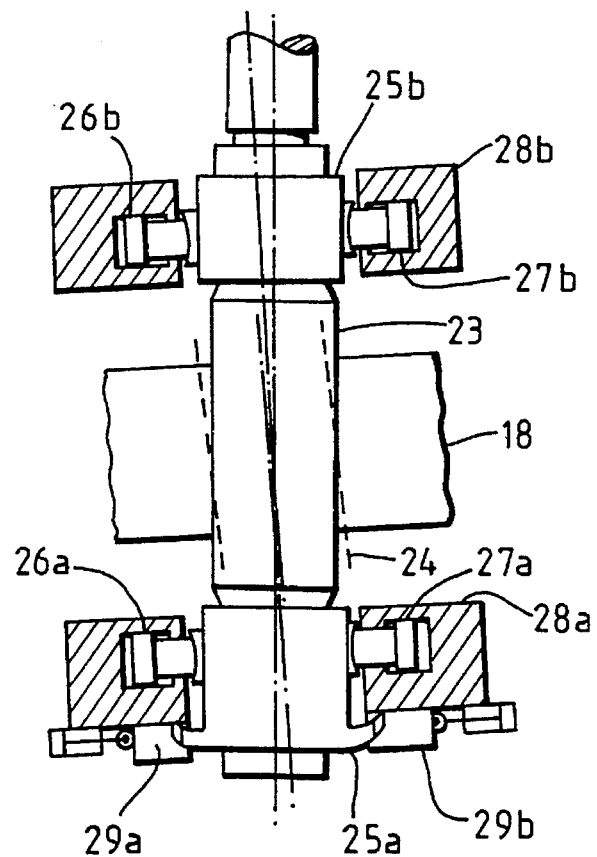
FIG. 26 is a top view illustrating a two-high rolling mill using the present invention in which the work rolls are turned in the horizontal plane so that their axis intersect, as seen in plan view.

FIG. 26 is a top view illustrating the two-high rolling mill in which the work roll axes cross. The upper work roll 23 is turned so that its axis is not parallel to the rolling direction by roll-cross generators 26a, 26b, 27a, and 27b arranged in housings 28a and 28b. Similarly, the lower work roll 24 oppositely turned in the horizontal plane. Their axes thus are tilted in opposite directions from a direction at right angles to the rolling pass direction in the horizontal plane. In the figure are shown the bearing sections 25a and 25b for the upper work roll, and thrust bearings 29a and 29b for bearing thrust forces acting on the work roll. Reference is made to EP-A-553480 and corresponding U.S. patent application Ser. No. 07/996,093 filed Dec. 23, 1992 and now U.S. Pat. No. 5,365,764 whose content is herein incorporated by reference, for a more detailed discussion of roll axis crossing.

Other methods of controlling the plate crown include moving rolls in the axial direction, making the rolls cross other than in the above-mentioned two-high rolling mill, and using a VC roll.

Methods of controlling the plate shape include moving the rolls in the axial direction, making the rolls cross, and using a VC roll.

As the first rolling of the slab is made on the No. 1 stand of the finishing rolling mills, the slab is made wider, resulting in that the width of the slab is not aligned at the beginning, the center, and end. Also, the width is made different depending on the thickness of the finally finished plate. It is effective in increasing accuracy of the plate width to make width rolling to adjust to a target width. If a width rolling mill is placed in front of the No. 1 stand, the width rolling can be made in anticipation of spreading after rolling. Also, if the width rolling mill is placed between the No. 1 stand and the No. 2 stand or between the No. 2 stand and the No. 3 stand, the width adjustment accuracy can be increased. It is a problem where the width rolling mill is to be placed in the former stands, as the width rolling will not become effective if the plate thickness is too thin. If rolling is made from 150 mm to 85 mm by one pass, for example, the friction coefficient $\mu_1$ in Eq. 1 may exceed 0.3 even in the two-high rolling mill. The width rolling mill should be in front of the two-high rolling mill. This allows pressing the plate into the rolling mill and the width adjustment as well, thus increasing the press-in property.

Further, two or more two-high rolling mills can be placed in one mill housing to further shorten the overall length of the rolling facility.

FIG. 22 is a side view of a second alternative hot-rolling plant which may be used in the invention. It differs from the plant of FIG. 21 in that the No. 2 stand 9 and the No. 3 stand 10 in FIG. 21 are contained in single mill housing to form a tandem two-high rolling mill 19. This construction can shorten the facility length as compared with the finishing rolling mill train 4 in FIG. 21, so that the facility can be made more compact.

While embodiments are described here by way of example, the invention is not limited to them, and variations and modifications can be made within the scope of the inventive concept.

What is claimed is:

1. Apparatus for continuous casting and hot-rolling of metal to produce metal strip, comprising, in a continuous production line:
   (i) a continuous caster for continuously casting said metal to produce cast slab having a predetermined casting thickness,
   (ii) an induction heater for reheating said cast slab, when said cast slab has said casting thickness, towards a hot-rolling mill train entry temperature by induction heating,
   (iii) a temperature-maintaining furnace arranged to receive said cast slab directly from said induction heater and adapted to effect homogenization of temperature in said cast slab,
   (iv) a hot-rolling mill train for hot-rolling said cast slab to said metal strip,
   (v) a thermally insulated storage chamber alongside said temperature-maintaining furnace for storing a length of said cast slab parallel to the direction of travel of said cast slab in said temperature-maintaining furnace, and
   (vi) a transfer conveyor for transferring a cast slab laterally between said temperature-maintaining furnace and said storage chamber, wherein said temperature-maintaining furnace has an opening covered by a closable door and extending parallel to a travel direction of the slab with a length corresponding to a length of a slab for accommodating lateral transfer of a slab by said transfer conveyor from the temperature-maintaining furnace to the thermally insulated storage chamber and from the thermally-insulated storage chamber back to the temperature-maintaining furnace.

2. Apparatus according to claim 1 wherein said temperature-maintaining furnace and said hot-rolling mill train are arranged for direct entry into the latter of said cast slab exiting from the former.

3. Apparatus according to claim 1 further having a second induction heater for heating said cast slab towards said hot-rolling mill entry temperature by induction heating, downstream of said temperature-maintaining furnace in said continuous production line.

4. Apparatus according to claim 3 further having a second temperature-maintaining furnace arranged to receive said cast slab directly from said second induction heater and adapted to effect temperature homogenization in said cast slab.

5. Apparatus according to claim 1 wherein said storage chamber has means for heating a said length of cast slab stored therein.

6. Apparatus for continuous casting and hot-rolling of metal to produce metal strip, comprising, in a continuous production line:
   (i) a continuous caster for continuously casting said metal to produce cast slab,
   (ii) cutting means for cutting said cast slab into slab lengths,
   (iii) a hot-rolling mill train for rolling said slab lengths into said metal strip, and
   (iv) at least one thermally insulated zone through which said slab lengths travel in said continuous production line between said cutting means and said hot-rolling mill train,
   (v) a thermally insulated storage chamber, adapted for storing at least one of said slab lengths, and arranged off-line with respect to said continuous production line and located alongside said thermally insulated zone, and
   (vi) slab transfer means for transferring said slab lengths to and fro between said thermally insulated zone and said thermally insulated storage chamber, wherein said storage chamber includes an opening covered by a selectively closable door and extending parallel to a travel direction of a slab length in the thermally insulated zone with an opening length corresponding to said slab length for accommodating lateral transfer of a slab length by said slab transfer means between the insulated zone and the insulated storage chamber.

7. Apparatus according to claim 6 wherein said thermally insulated storage chamber is arranged for storage of said slab lengths parallel to the direction of travel of said slab lengths in said thermally insulated zone.

8. Apparatus according to claim 6 wherein said transfer means is adapted to transfer said slabs directly between said thermally insulated zone and said storage chamber with minimized heat loss.

9. Apparatus according to claim 6 wherein said thermally insulated storage chamber is adapted to hold a plurality of said slab lengths as a stack.

10. Apparatus according to claim 6 wherein said thermally insulated storage chamber has means for heating a said slab length stored therein.

11. Apparatus according to claim 6 having an induction heater for heating said slab lengths inductively, upstream of said thermally insulated zone in said continuous production line.

12. Apparatus according to claim 6 wherein said hot-rolling mill train has a plurality of thickness-reducing roll stands, of which a number, being at least one, at the upstream end of said hot-rolling mill train are two-high roll stands.

13. Apparatus according to claim 12 wherein at least one of said two-high roll stands is a roll stand having upper and lower rolls whose axes are mutually oppositely and symmetrically turned in a horizontal plane from the directions perpendicular to the rolling pass direction.

14. Apparatus according to claim 12 having two said two-high roll stands, arranged in a common mill housing 23.

15. A method of continuous casting and hot-rolling of metal to produce metal strip, wherein the following steps are carried out in sequence in a continuous production line:

(i) continuously casting said metal to produce cast slab, (ii) cutting said cast slab into slab lengths, (iii) passing said slab lengths through a thermally insulated zone in which temperature homogenization takes place in said slab lengths, and (iv) hot-rolling said slab lengths in a hot rolling mill train to produce said metal strip, said method being characterized by, in the event of a stoppage in the operation of said hot-rolling mill train, transferring at least one said slab length laterally from said thermally insulated zone into a thermally insulated storage zone alongside said thermally insulated zone, and by transferring said at least one slab length back from said storage zone to said thermally insulated zone when it is required for hot-rolling, wherein said transferring said at least one slab length between the thermally insulated zone and the thermally insulated storage zone is carried out by transferring said at least one slab length through an opening of the thermally insulated zone which is covered by a selectively closable door and extends parallel to a travel direction of the slab length in the thermally insulated zone with an opening length corresponding to said slab length.

16. A method according to claim 15 including the step of causing at least one subsequently cast slab length to proceed to said hot-rolling ahead of said at least one slab length which is transferred to said storage chamber.

17. A method according to claim 15 including stacking a plurality of said slab lengths one on another in said storage chamber.

18. A continuous production line for continuous casting and hot rolling of metal to produce metal strip, comprising;

a continuous caster for producing cast slab, a cutter for cutting the cast slab into slab lengths, a hot-rolling mill train for rolling said cast slab lengths into metal strip, a temperature maintaining furnace disposed between the cutter and the hot-rolling mill train, a thermally insulated storage chamber for temporarily storing said cast slab lengths during interruption of operation of the hot-rolling train to thereby accommodate continuous operation of the continuous caster, the furnace and the storage chamber having respective facing lateral openings extending parallel to a travel direction of slab lengths through the furnace, said openings having a length sufficient to accommodate lateral transfer of slab lengths between the furnace and storage chamber, and a slab length transfer conveyor for transferring the slab lengths laterally through said openings from the furnace to the storage chamber during interruption of operation of the hot rolling train and from the storage chamber back to the furnace after recommencement of operation of the hot rolling train and after completion of emptying of the caster, whereby interruption in operation of the hot rolling train is accommodated without interrupting completion of emptying of the caster and without requiring any additional length to the production line to accommodate temporary slab lengths storage in the storage chamber.

19. A continuous production line according to claim 18, further comprising selectively openable and closable doors on at least one of the openings in the furnace and the storage chamber.

20. A continuous production line according to claim 18, further comprising selectively openable and closable doors covering the opening on both the furnace and the storage chamber.

21. A continuous production line according to claim 18, wherein said slab length transfer conveyor includes means for moving the slab lengths substantially only in directions transverse to the travel direction of the slab length through the furnace 22. A continuous production line according to claim 18, wherein said slab length transfer conveyor includes a slab length carrier which is transversely movable through openings at both lateral sides of the furnace to accommodate pick up and transfer of the slab lengths between the furnace and storage chamber.

23. A continuous production line according to claim 20, wherein said slab length transfer conveyor includes a slab length carrier which is transversely movable through openings at both lateral sides of the furnace to accommodate pick up and transfer of the slab lengths between the furnace and storage chamber.

24. A continuous production line according to claim 18, wherein said furnace is continuously closed at its lateral side opposite its lateral opening, and wherein said slab length transfer conveyor includes a slab length carrier which is transversely movable into and out of said furnace lateral opening during transfer of said slab lengths into and out of said furnace from and to the storage chamber.

25. A method for continuous casting and hot rolling of metal to produce metal strip, comprising:

producing cast slab in a continuous caster, cutting the cast slab into slab lengths at a cutter, hot rolling said cast slab lengths to metal strip in a hot rolling mill train, maintaining the temperature of said cast slab lengths in a temperature maintaining furnace disposed between the cutter and the hot-rolling mill train, temporarily storing the cast slab lengths in a thermally insulated storage chamber for temporarily storing said cast slab lengths during interruption of operation of the hot-rolling train to thereby accommodate continuous operation of the continuous caster, the furnace and the storage chamber having respective facing lateral openings extending parallel to a travel direction of the slab lengths through the furnace, said openings having a length sufficient to accommodate lateral transfer of the slab lengths between the furnace and storage chamber, and selectively transferring the slab lengths laterally through said openings from the furnace to the storage chamber during interruption of operation of the hot rolling train and from the storage chamber back to the furnace after recommencement of operation of the hot rolling train and after completion of emptying of the caster, whereby interruption in operation of the hot rolling train is accommodated without interrupting completion of emptying of the caster and without requiring any additional length to the production line to accommodate temporary slab storage in the storage chamber.

26. A method for continuous casting and hot rolling of metal to produce metal strip according to claim 25, further comprising selectively opening and closing doors on at least one of the openings in the furnace and the storage chamber.

27. A method for continuous casting and hot rolling of metal to produce metal strip according to claim 25, wherein said transferring includes moving the slab lengths substantially only in directions transverse to the travel direction of the slab lengths through the furnace.

* * * * *